United States Patent
Kami

(10) Patent No.: US 9,872,125 B2
(45) Date of Patent: Jan. 16, 2018

(54) DATA COLLECTION AND MANAGEMENT SYSTEM, DATA COLLECTION AND MANAGEMENT METHOD, TERMINAL, AND MANAGEMENT APPARATUS

(71) Applicant: NEC Corporation, Minato-ku, Tokyo (JP)

(72) Inventor: Nobuharu Kami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 13 days.

(21) Appl. No.: 14/779,067

(22) PCT Filed: Mar. 25, 2014

(86) PCT No.: PCT/JP2014/058348
§ 371 (c)(1),
(2) Date: Sep. 22, 2015

(87) PCT Pub. No.: WO2014/157240
PCT Pub. Date: Oct. 2, 2014

(65) Prior Publication Data
US 2016/0057561 A1 Feb. 25, 2016

(30) Foreign Application Priority Data
Mar. 26, 2013 (JP) .................. 2013-063579

(51) Int. Cl.
*H04W 4/00* (2009.01)
*H04W 24/10* (2009.01)
(Continued)

(52) U.S. Cl.
CPC .......... *H04W 4/005* (2013.01); *H04W 24/10* (2013.01); *H04W 68/005* (2013.01); *H04W 88/02* (2013.01)

(58) Field of Classification Search
USPC ........................................... 370/329
See application file for complete search history.

(56) References Cited

U.S. PATENT DOCUMENTS

| 2005/0096990 | A1 | 5/2005 | Algiene et al. |
| 2007/0153802 | A1* | 7/2007 | Anke ............... H04L 47/10 370/395.42 |
| 2012/0002733 | A1 | 1/2012 | Misra et al. |

FOREIGN PATENT DOCUMENTS

| JP | 2005-346278 A | 12/2005 |
| JP | 2007-080190 A | 3/2007 |

(Continued)

OTHER PUBLICATIONS

Extended European Search Report for EP Application No. EP14775150.7 dated Oct. 10, 2016.
(Continued)

*Primary Examiner* — Kouroush Mohebbi

(57) ABSTRACT

A data collection and management system includes: a terminal(s) that transmits measured data; and a management apparatus that receives and manages the measured data transmitted from the terminal(s). The management apparatus includes a notification unit that notifies the terminal(s) of transmission cost information indicating a cost incurrable upon transmitting measured data to the management apparatus by the terminal(s). The terminal(s) includes: a calculation unit that calculates an information value indicating a value of measured data as information; and a transmission control unit that determines whether to transmit measured data to the management apparatus based on the information value and the transmission cost information.

9 Claims, 13 Drawing Sheets

(51) Int. Cl.
*H04W 68/00* (2009.01)
*H04W 88/02* (2009.01)

(56) References Cited

FOREIGN PATENT DOCUMENTS

| | | | |
|---|---|---|---|
| JP | 2010-026815 A | 2/2010 |
| JP | 2011-076322 A | 4/2011 |
| JP | 2011-146989 A | 7/2011 |
| JP | 2011-188338 A | 9/2011 |
| JP | 2011-244406 A | 12/2011 |
| JP | 2012-080356 A | 4/2012 |

OTHER PUBLICATIONS

International Search Report for PCT Application No. PCT/JP2014/058348, dated Jun. 24, 2014.
Japanese Office Action for JP Application No. 2013-221789 dated Jul. 25, 2017 with English Translation.

\* cited by examiner

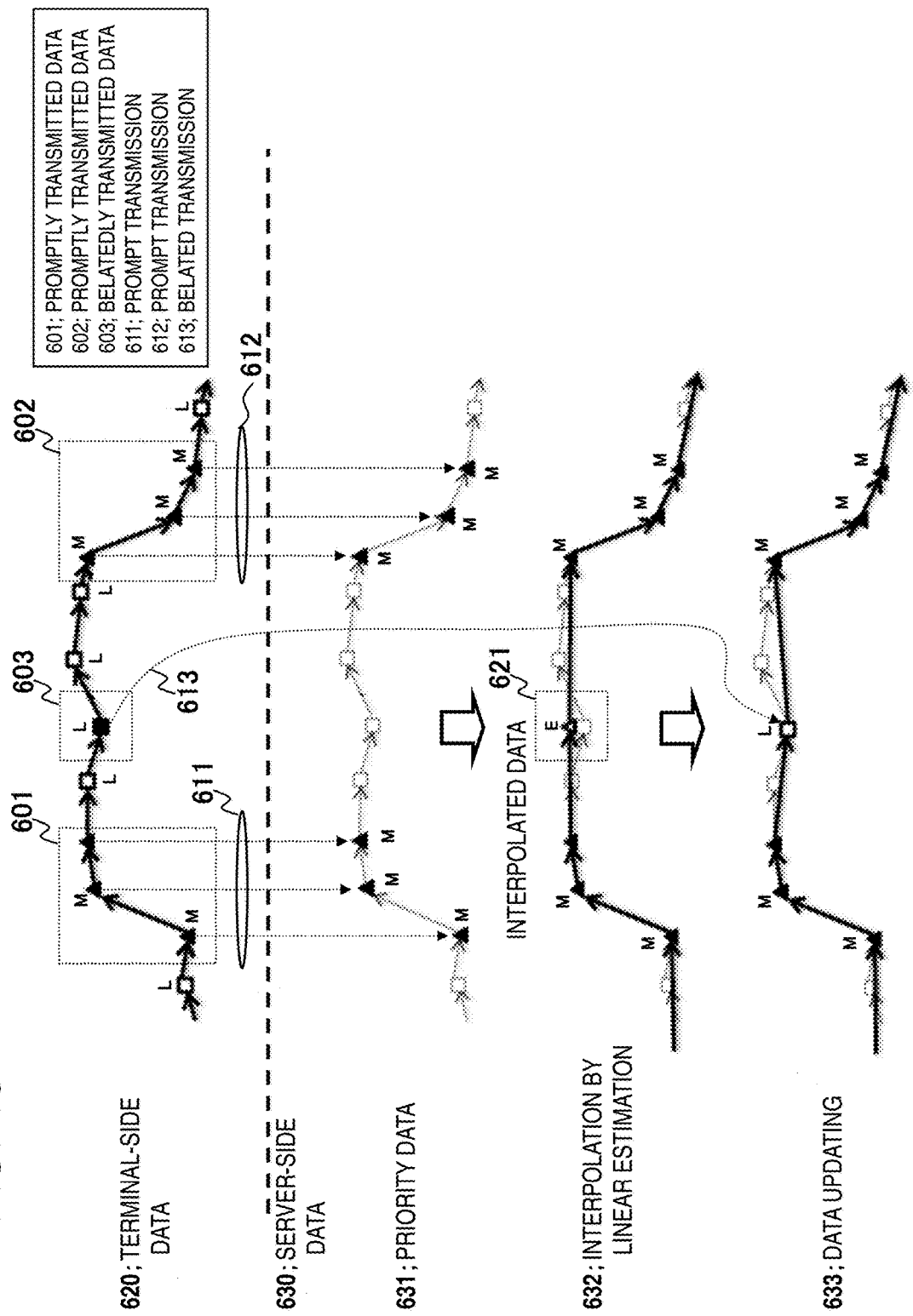

DATA COLLECTION AND MANAGEMENT SYSTEM, DATA COLLECTION AND MANAGEMENT METHOD, TERMINAL, AND MANAGEMENT APPARATUS

CROSS-REFERENCE TO RELATED APPLICATIONS

This is a national stage of International Application No. PCT/JP2014/058348 filed Mar. 25, 2014, claiming priority based on Japanese Patent Application No. 2013-063579 filed Mar. 26, 2013, the entire contents of which are incorporated herein by reference.

TECHNICAL FIELD

The present invention relates to a data collection and management system, a data collection and management method, a terminal, and a management apparatus. In particular, it relates to a data collection and management system, a data collection and management method, a terminal, and a management apparatus which relate to data that is collected via a network and is accumulated.

BACKGROUND

In recent years, research and development has been actively done on use of data, which is collected from various sensors in a system as typified by a machine-to-machine (M2M) system, for various applications. In an M2M system, data obtained from various sensors is collected in a time-series manner, and the collected data is transmitted to a management server via a network, in particular, via a mobile network. The management server manages the data collected from various sensors (time-series data) so that various applications can use the data. Currently, such time-series data uniformly consumes resources (for example, the network band and the resources of the management server).

However, such data has different importance, depending on the application or the situation in which the data is used. For example, there is an application that acquires the tracks of moving vehicles by regularly acquiring information about the positions of the vehicles. This application can analyze the traffic congestion status or the like at a certain location. For example, when a vehicle drives on an expressway at a constant speed, many points can accurately be interpolated from rough data points. Namely, data other than representative points (data points) has a low value (not important). In addition, since vehicles drive at a very low speed in an area where a traffic congestion is caused, measurement of data at short intervals is not necessary. However, when a vehicle drives on complicated streets or repeatedly stops and goes, it is difficult to accurately detect the position of the vehicle without many data near each change point. Therefore, even when the same type of data is used (for example, vehicle position information), the data could have different importance, depending on the application or the situation in which the data is used. Namely, the importance of the data changes dynamically.

Patent Literature (PTL) 1 discloses a technique in which vehicle data collected by an on-vehicle portable terminal equipment is classified according to type. In PTL 1, the transmission timing is adjusted on the basis of a predetermined priority. For example, while data relating to safety of a vehicle is transmitted promptly to a management server, non-urgent data such as fault diagnosis information is transmitted after the vehicle is stopped. PTL 2 discloses a technique in which two queues are prepared, each being provided with a priority in advance, and the transmission timing is adjusted. In addition, PTL 3 discloses a configuration in which sensor data is stored in a buffer on the basis of a type of the data, a predetermined calculation is performed, and whether to transmit the data is determined. In addition, PTL 4 discloses a technique in which, on the basis of a fluctuation range of detection data, the importance of data acquired from a sensor is determined and the data transmission frequency is changed.

PTL 1: Japanese Patent Kokai Publication No. JP2011-076322A
PTL 2: Japanese Patent Kokai Publication No. JP2010-026815A
PTL 3: Japanese Patent Kokai Publication No. JP2011-244406A
PTL 4: Japanese Patent Kokai Publication No. JP2011-188338A

SUMMARY

The disclosure of each of the above PTLs is incorporated herein by reference thereto. The following analysis has been given by the present inventors.

As described above, even when the same type of data is used, the data could have different importance, depending on the application or the situation in which the data is used. Namely, the importance of the data changes dynamically. According to the techniques disclosed in PTLs 1 and 2, priorities need to be defined in advance. Namely, according to the techniques disclosed in PTLs 1 and 2, the data transmission timing is adjusted on the basis of static settings. Therefore, the techniques disclosed in PTLs 1 and 2 cannot accommodate cases where data is of the same type and of different importance (cases where the importance changes dynamically), for example. Likewise, the technique disclosed in PTL 3 cannot accommodate the dynamic change of the importance of data. As a result, if any one of the techniques disclosed in PTLs 1 to 3 is applied to a system, the system has a problem with its low resource use efficiency. In addition, the technique disclosed in PTL 4 is a technique in which, when collision of data could occur, the data transmission frequency is changed on the basis of the importance of the data. Namely, data having higher importance is processed preferentially. However, according to the technique disclosed in PTL 4, data is still transmitted at predetermined intervals, whether the importance of the data is high or low. Thus, in a receiving apparatus that receives the data, there is no change regarding the resources consumed by the data. Namely, as long as the data receiving apparatus processes the values of these data equally, the resource use efficiency is low.

The above problem is attributable to uniformly uploading data collected by terminals and the like to a management server via a network such as a mobile network and storing the data in a database. Namely, since the data collected by the terminals and the like is processed as data having the same value, a lot of network resources or calculation resources are wasted. Depending on an application used (analytical processing of any type), the data collected by the terminals includes, for example, many non-urgent data or many redundant data that affects the analysis result little. However, data having high importance and data having low importance (non-urgent data or redundant data) uniformly consume resources.

The present invention has been made in view of the above circumstances, and it is an object of the present invention to provide a data collection and management system, a data collection and management method, a terminal, and a management apparatus that contribute to improving the resources use efficiency.

According to a first aspect of the present invention, there is provided a data collection and management system, including: a terminal(s) that transmits measured data; and a management apparatus that receives and manages the measured data transmitted from the terminal(s), wherein the management apparatus includes a notification unit that notifies the terminal(s) of transmission cost information indicating a cost incurrable upon transmitting measured data to the management apparatus by the terminal(s), wherein the terminal(s) includes: a calculation unit that calculates an information value indicating a value of measured data as information; and a transmission control unit that determines whether to transmit measured data to the management apparatus based on the information value and the transmission cost information.

According to a second aspect of the present invention, there is provided a data collection and management method, including: causing a terminal(s) to transmit measured data to a management apparatus; causing a management apparatus to notify the terminal(s) of transmission cost information indicating a cost incurrable upon transmitting measured data to the management apparatus by the terminal(s); calculating an information value indicating a value of measured data as information; and causing the terminal(s) to determine whether to transmit measured data to the management apparatus based on the information value and the transmission cost information.

This method is associated with certain machines, namely, with the terminal(s) and the management apparatus.

According to a third aspect of the present invention, there is provided a terminal, including: a calculation unit that calculates an information value indicating a value of measured data as information; and a transmission control unit that determines whether to transmit measured data to a management apparatus based on: transmission cost information indicating a cost incurrable upon transmitting the measured data by the terminal to the management apparatus that manages measured data; and the information value.

According to a fourth aspect of the present invention, there is provided a management apparatus, including: a reception unit that receives measured data transmitted from a terminal(s); and a notification unit that notifies the terminal(s) of transmission cost information indicating a cost incurrable upon transmitting measured data to the management apparatus by the terminal(s).

According to the above aspects of the present invention, a data collection and management system, a data collection and management method, a terminal, and a management apparatus that contribute to improving the resource use efficiency are provided.

BRIEF DESCRIPTION OF THE DRAWINGS

FIG. 10 illustrates data processing performed by the server 20.

PREFERRED MODES

Figure 1:
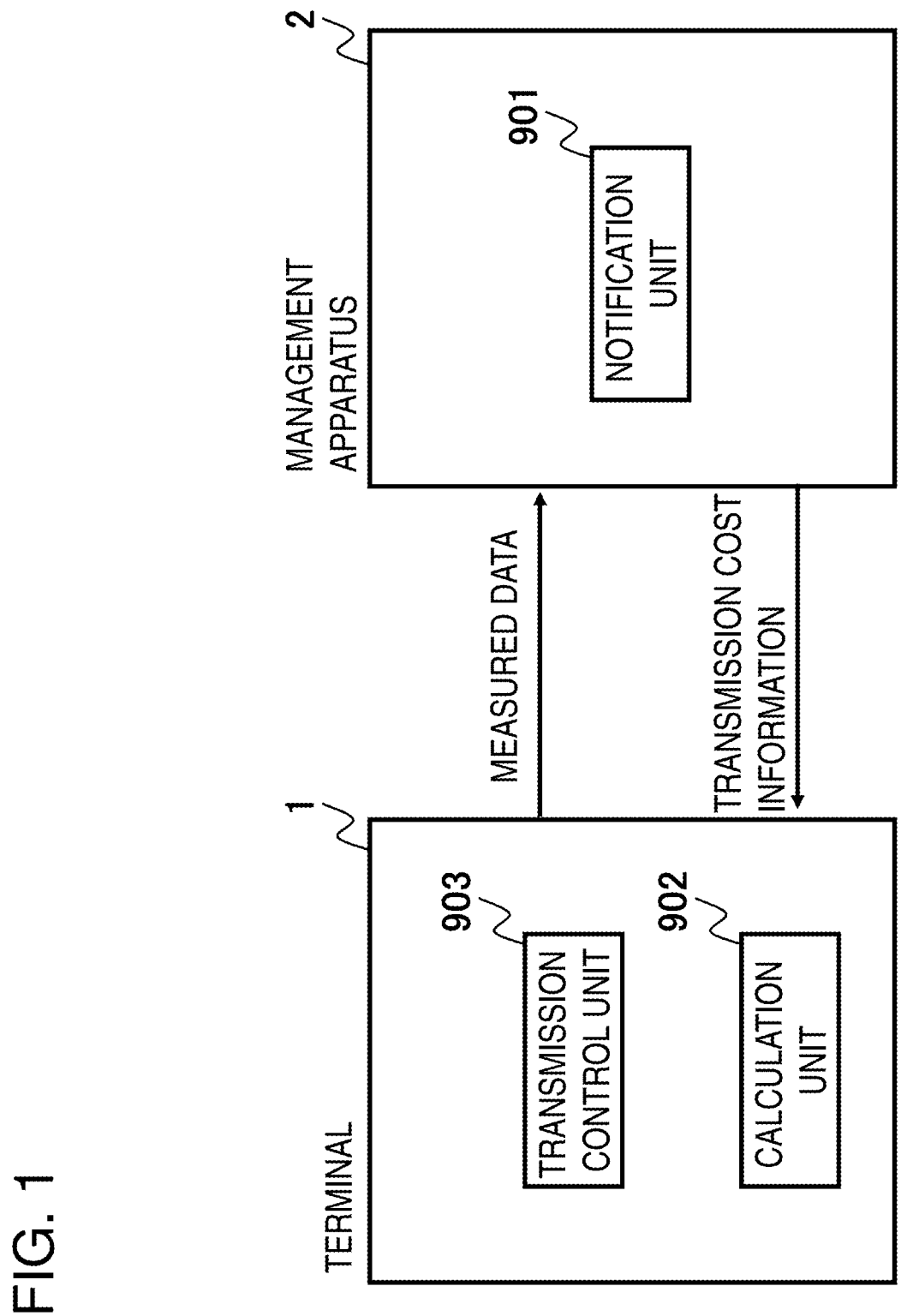
FIG. 1 illustrates an outline of an exemplary embodiment.

First an outline of an exemplary embodiment will be described with reference to FIG. 1. In the following outline, various components are denoted by reference characters for the sake of convenience. Namely, the following reference characters are merely used as examples to facilitate understanding of the present invention. The description of the outline is not intended to impose any limitations on the present invention.

As described above, the resource use efficiency in a data collection and management system that manages data collected from terminals needs to be improved.

To this end, for example, a data collection and management system illustrated in FIG. 1 is provided. The data collection and management system illustrated in FIG. 1 includes a terminal 1 that transmits measured data and a management apparatus 2 that receives and manages measured data transmitted from the terminal 1. The management apparatus 2 includes a notification unit 901 that notifies the terminal 1 of transmission cost information indicating a cost incurrable upon transmitting measured data to the management apparatus 2 by the terminal 1. The terminal 1 includes a calculation unit 902 that calculates an information value indicating a value of measured data as information and a transmission control unit 903 that determines whether to transmit measured data to the management apparatus 2 based on the information value and the transmission cost information.

With the above configurations and functions, in the data collection and management system illustrated in FIG. 1, data having higher importance preferentially consumes the system resources (for example, the network band between the terminal 1 and the management apparatus 2 and the calculation resources of the management apparatus 2). More specifically, before transmitting measured data, the terminal 1 calculates the value (information value) of the measured data. If the value of the measured data is low or if the cost required for transmission of the measured data is high, the terminal 1 does not transmit the measured data. As a result, it is possible to improve the resource use efficiency without deteriorating the accuracy in various types of analysis and the like performed by using measured data managed by the management apparatus 2.

Hereinafter, specific exemplary embodiments will be described in detail with reference to drawings.

[First Exemplary Embodiment]

A first exemplary embodiment will be described in detail with reference to drawings.

Figure 2:
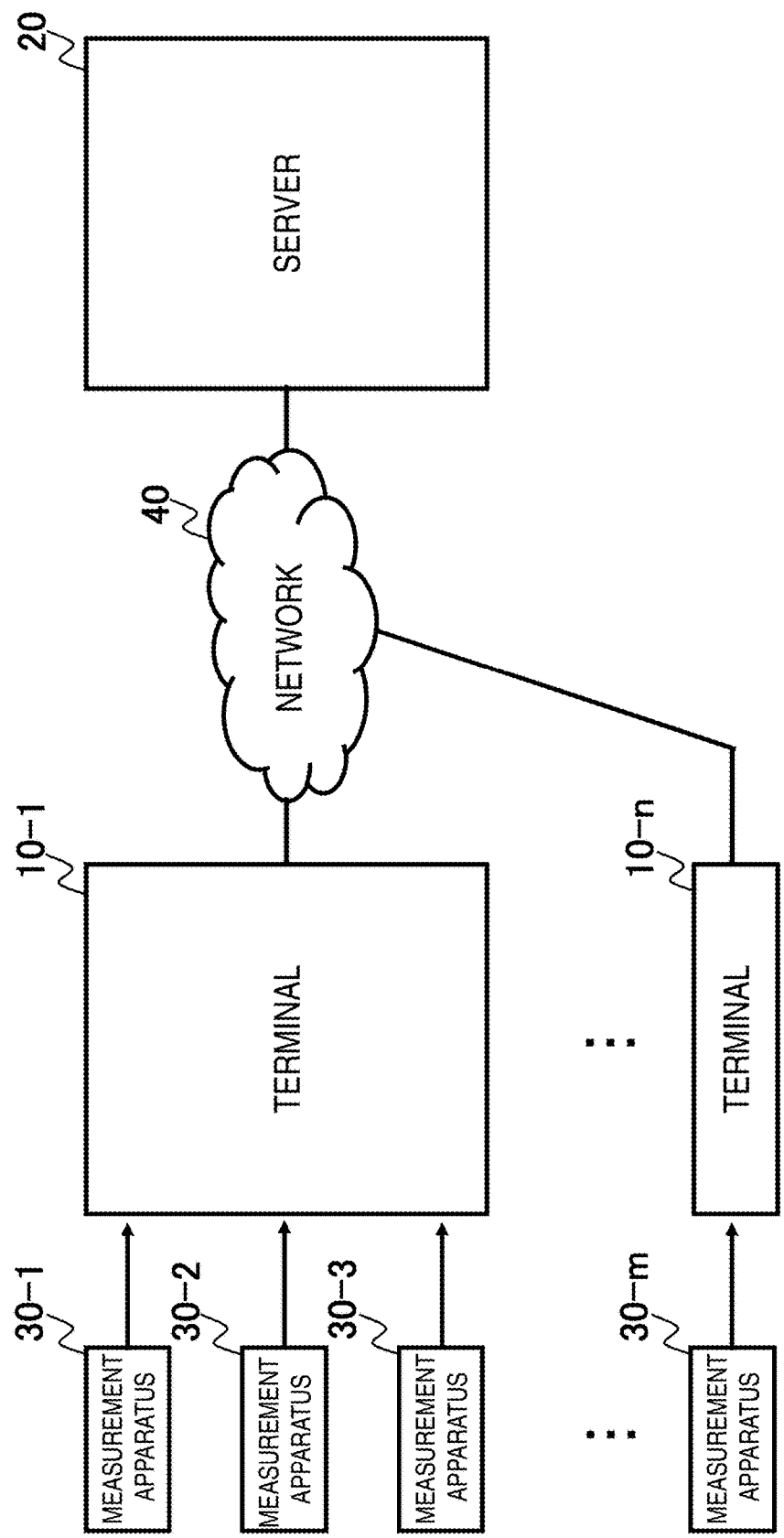
FIG. 2 illustrates an example of a configuration of a data collection and management system according to a first exemplary embodiment.

FIG. 2 illustrates an example of a configuration of a data collection and management system according to the present exemplary embodiment. As illustrated in FIG. 2, the data collection and management system includes a plurality of terminals 10-1 to 10-*n* (n is a positive integer), a server 20, and a plurality of measurement apparatuses 30-1 to 30-*m* (m is a positive integer) each of which includes a sensor or the like. Hereinafter, any one of the terminals 10-1 to 10-*n* will be referred to as a "terminal 10" unless the terminals 10-1 to 10-*n* need to be distinguished from each other. Likewise, any one of the measurement apparatuses 30-1 to 30-*m* will be referred to as a "measurement apparatus 30" unless the measurement apparatuses 30-1 to 30-*m* need to be distinguished from each other.

An individual measurement apparatus 30 transmits measured data obtained from its internal sensor to a corresponding terminal 10 in response to a request from the corresponding terminal 10. The terminals 10 are connected to the server 20 via a network 40. The terminals 10 output measured data to the server 20. The server 20 receives the measured data transmitted from the respective terminals 10 and manages the received measured data. In addition, the server 20 outputs control signals to the terminals 10. The configuration illustrated in FIG. 2 is only an example, and therefore the configuration of the system is not limited thereto. For example, a measurement apparatus 30 and a terminal 10 may be stored in the same casing.

Figure 3:
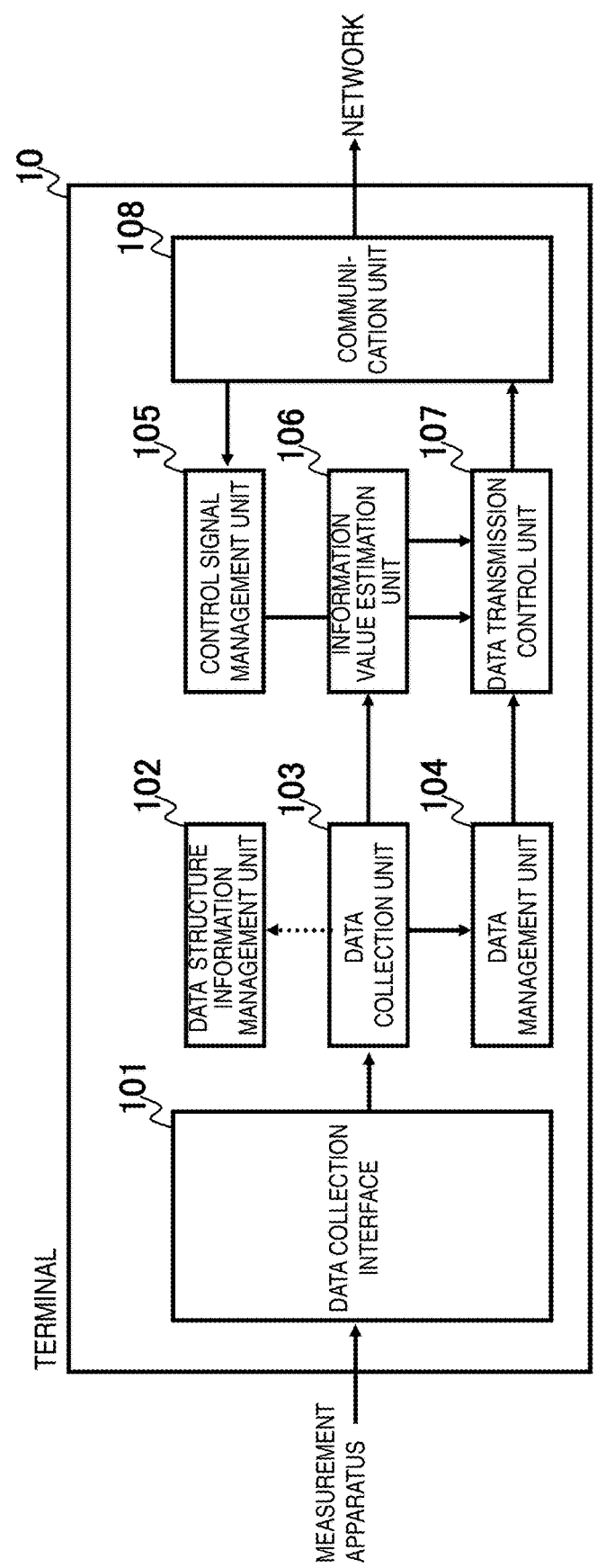
FIG. 3 illustrates an example of an internal configuration of a terminal 10.

FIG. 3 illustrates an example of an internal configuration of a terminal 10. As illustrated in FIG. 3, the terminal 10 includes a data collection interface 101, a data structure information management unit 102, a data collection unit 103, a data management unit 104, a control signal management unit 105, an information value estimation unit 106, a data transmission control unit 107, and a communication unit 108.

The data collection interface 101 is a control interface connected to the corresponding measurement apparatuses 30. The data collection interface 101 collects measured data from the measurement apparatuses 30. The measured data collected by the data collection interface 101 is data collected by various sensors such as about the position of the terminal 10, the acceleration of the terminal 10 when the terminal 10 moves, and the ambient temperature or humidity around the terminal 10. The format of the measured data collected by the data collection interface 101 is not particularly limited. For example, the measured data may be binary data obtained by converting data outputted from various sensors into digital signals or may be text data.

The data collection unit 103 collects the measured data from the data collection interface 101. By referring to information stored in the data structure information management unit 102, the data collection unit 103 determines how the measured data needs to be handled. More specifically, if the measured data is determination data which will be described below, the data collection unit 103 outputs the measured data (determination data) to the data management unit 104 and the information value estimation unit 106. However, if the measured data is not such measured data (if the measured data is dependent data which will be described below), the data collection unit 103 outputs the measured data to the data management unit 104, not to the information value estimation unit 106. In this way, depending on the determination made on the basis of the information stored in the data structure information management unit 102, the data collection unit 103 outputs the measured data to the data management unit 104 and the information value estimation unit 106.

The data management unit 104 stores and manages measured data.

The data structure information management unit 102 stores attribute classification information that is provided for determination of an information value of data. The attribute classification information stored in the data structure information management unit 102 is set by an administrator of the system in advance. The attribute classification information will be described in detail below.

The control signal management unit 105 manages a control signal transmitted from the server 20. The control signal management unit 105 outputs a calculation result obtained from a control signal transmitted from the server 20 to the data transmission control unit 107 as transmission cost for the terminal 10. The control signal transmitted from the server 20 and the transmission cost will be described in detail below.

The information value estimation unit 106 estimates the value of measured data collected by the data collection unit 103 on the basis of measured data in the past. In this way, the information value estimation unit 106 calculates the information value of the measured data. The information value calculated by the information value estimation unit 106 is a value index parameter that is used to determine whether to transmit the measured data to the server 20. The information value estimation unit 106 outputs the calculated information value to the data transmission control unit 107.

The data transmission control unit 107 determines whether to transmit the measured data to the server 20 on the basis of the information value calculated by the information value estimation unit 106 and the transmission cost outputted from the control signal management unit 105. If the data transmission control unit 107 determines to transmit the measured data to the server 20, the data transmission control unit 107 acquires the measured data from the data management unit 104 and transmits the measured data to the server 20 via the communication unit 108.

Figure 4:
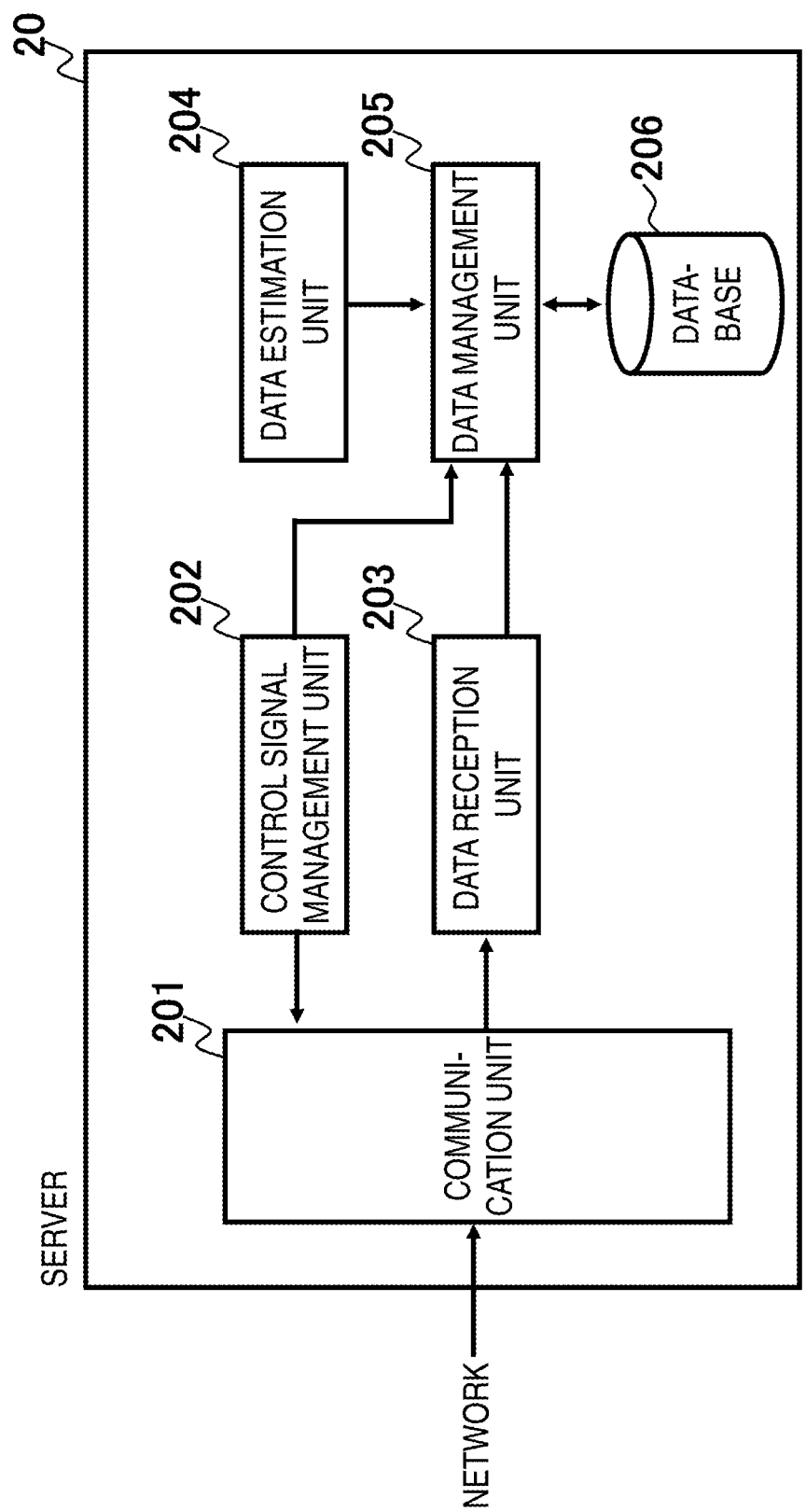
FIG. 4 illustrates an example of an internal configuration of a server 20.

FIG. 4 illustrates an example of an internal configuration of the server 20. As illustrated in FIG. 4, the server 20 includes a communication unit 201, a control signal management unit 202, a data reception unit 203, a data estimation unit 204, a data management unit 205, and a database 206.

The communication unit 201 is means for mutually communicating with the terminals 10. The communication unit 201 receives measured data transmitted from the terminals 10 and transmits control signals to the terminals 10.

The data reception unit 203 receives the measured data transmitted from the terminals 10. The data reception unit 203 outputs the received measured data to the data management unit 205.

The data management unit 205 registers the received measured data in the database 206. In addition, the data management unit 205 is means that supports data access (reading, writing, updating, etc.) from the outside (for example, from an apparatus that analyzes measured data). To manage data, the database 206 can be configured as a relational database. However, another configuration may alternatively be used.

The data estimation unit 204 is means for estimating unreceived measured data from the measured data (existing measured data) registered in the database 206.

The control signal management unit 202 is means for generating control signals from the existing measured data. An individual control signal includes information that is necessary for a terminal 10 to perform data transmission control. The control signal management unit 202 transmits the control signals to the terminals 10 via the communication unit 201. The control signal management unit 202 may regularly generate and transmit the control signals or on demand from the outside such as from an administrator. The following description will be made assuming that the control signal management unit 202 regularly generates and transmits control signals at preset intervals.

Each unit included in an individual terminal 10 may be realized by a computer program that causes a computer included in the terminal 10 to use hardware of the computer and to perform processing described in detail below.

Next, an operation of each unit included in a terminal 10 will be described.

The terminal 10 transmits measured data acquired from its corresponding measurement apparatuses 30 to the server 20. Before transmitting the measured data, the terminal 10 performs dynamic data transmission control on the measured data. More specifically, the terminal 10 adjusts timing at which the measured data is transmitted or selects data that needs to be transmitted. When performing such operation, the terminal 10 uses the attribute classification information stored in the data structure information management unit 102.

Figure 5A:
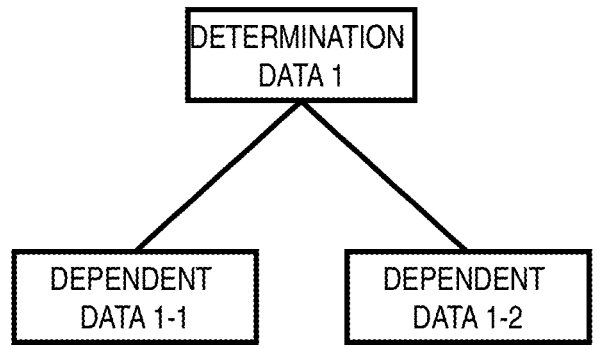
FIGS. 5A-5C illustrate examples of attribute classification information stored in a data structure information management unit 102.
Figure 5B:
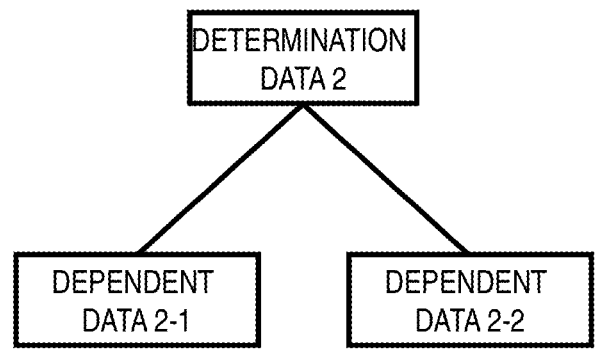
Figure 5C:
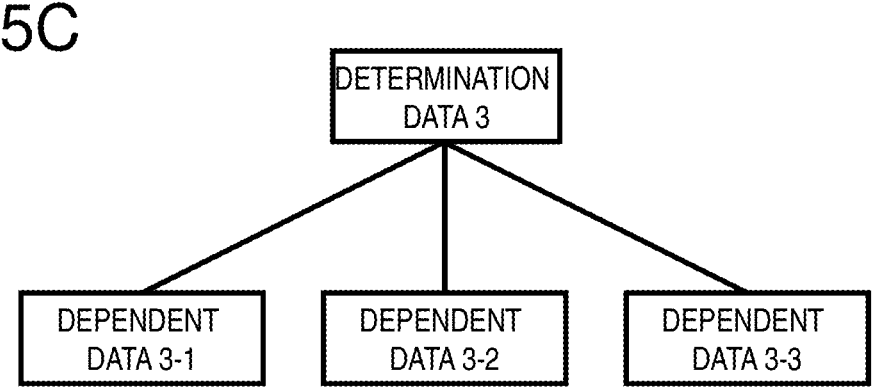

FIGS. 5A-5C illustrate examples of attribute classification information stored in the data structure information management unit 102. As illustrated in FIGS. 5A-5C, the data structure information management unit 102 previously holds a relationship among the measured data illustrated in FIGS. 5A-5C. Measured data can be classified into one of the two attributes of determination data and dependent data. Determination data is a parent node, and dependent data is a child node. These data have a master-servant relationship as illustrated in FIGS. 5A-5C. For example, determination data 1 is a parent node of dependent data 1-1 and 1-2 (see FIG. 5A). Measured data is classified into an attribute, namely, into determination data or dependent data. The dependent data is dependent on at least one determination data. The data structure information management unit 102 holds a data relationship applied to the measured data obtained from the corresponding measurement apparatuses 30. For example, position information indicating the position of the terminal 10 can be considered as determination data. In contrast, for example, the movement speed of the terminal 10 can be considered as dependent data that is dependent on the determination data.

The data collection unit 103 collects various data measured by the corresponding measurement apparatuses 30 via the data collection interface 101. The data collection unit 103 may collect the measured data at predetermined intervals. Alternatively, the measured data may be uploaded by the measurement apparatuses 30 asynchronously. In either way, the data collection unit 103 uses regularly-provided data collection time slots to keep track of time at which measured data is collected. By using time slot numbers, the data collection unit 103 manages the measured data. The time slot numbers are synchronized between an individual terminal 10 and the server 20. The synchronization between an individual terminal 10 and the server 20 is achieved by causing the terminal 10 to synchronize with the server 20 when the terminal 10 is started.

The data collection unit 103 stores measured data that is collected at the same time slot in the data management unit 104, by using a data structure made in view of the attribute classification information that is managed by the data structure information management unit 102 and that has a master-servant relationship. The data structure is for associating dependent data stored in the data management unit 104 with determination data so that the dependent data can be extracted by using the determination data as a key. If the data collection unit 103 cannot acquire determination data serving as a parent of dependent data within the same time slot, the data collection unit 103 associates the next determination data to be acquired with the dependent data.

The control signal management unit 105 manages a control signal received from the server 20. The control signal transmitted from the server 20 represents transmission cost information used by the data transmission control unit 107 to determine whether to transmit measured data to the server 20. In addition, the control signal is a processed and shaped signal so that, after receiving transmission cost information, the terminal can calculate a transmission cost required to transmit the corresponding measured data.

For example, if the control signal management unit 105 acquires a control signal about the position, the control signal management unit 105 manages transmission cost information in which the transmission position is used as the key.

If the data collection unit 103 acquires new measured data and if the acquired measured data is determination data, the data collection unit 103 outputs the measured data and the measured time slot number to the information value estimation unit 106.

The information value estimation unit 106 includes a prediction module and estimates the information value of received measured data from prediction information. The information value of the measured data represents the amount of decrease in prediction performance when the measured data is assumed to be absent. More specifically, if measured data can be predicted accurately, the information value of the measured data is determined to be low. This is because, even when such measured data that can be predicted accurately does not exist, interpolated data can be generated from other measured data. Namely, the information value of measured data estimated by the information value estimation unit 106 is an index that quantifies the magnitude of the impact caused by presence/absence of the measured data. It is desirable that a prediction and estimation module using measured data in the past be used and that the information value of measured data be determined by the magnitude of the difference between a result obtained by prediction and estimation that uses the measured data and a result obtained by prediction and estimation that does not use the measured data.

It is only necessary that the prediction module of the information value estimation unit 106 predicts probability distribution of measured data at a time slot any time after the next time slot by using measured data that has already been acquired (measured data in the past). For example, for the prediction module, it is possible to use means that uses a recursive filter as typified by a Kalman filter, so as to estimate a state while sequentially updating an internal state without history information in the past. However, realization of the prediction module is not limited to use of a Kalman filter. Prediction using other derived filters, time-series data analysis methods, or machine learning is applicable.

Figure 6:
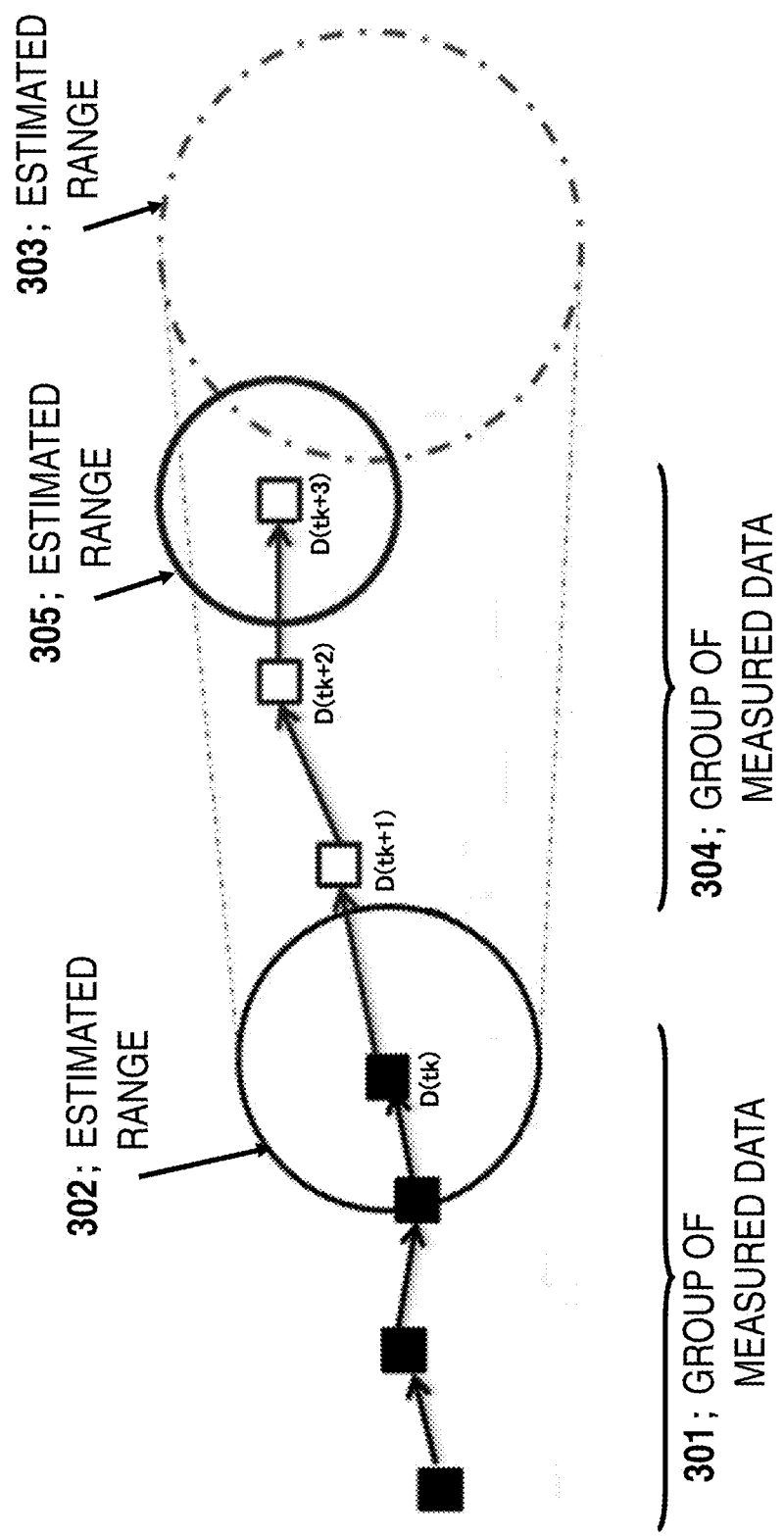
FIG. 6 illustrates an example of calculation of an information value.

Next, an example of calculation of an information value will be described with reference to FIG. 6. In FIG. 6, the current time slot number is tk, and the measured data corresponding to tk is D(tk). The following example will be described assuming that the data management unit 104 holds a group of measured data 301 that has been collected up until the current time and that the information value estimation unit 106 holds, as an estimation range 302, an estimated range in which the current data including a measurement error falls most probably. In addition, the estimated and predicted range of data corresponding to time slot number tk+3, which is three time slots after the current time slot number, will be indicated as an estimated range 303. Under such circumstances, the data management unit 104 actually acquires measured data per time slot, thereby acquiring a group of measured data 304 including D(tk+1) to D(tk+3).

The information value estimation unit 106 updates the estimated range 302 each time the information value estimation unit 106 acquires measured data. As a result of the updating of the estimated range, the predicted and estimated range corresponding to the time slot number tk+3 is updated to an estimated range 305. Namely, the estimated range 305 is the most accurately estimated range obtained by using all the acquired measured data, and the estimated range 303 is the most accurately estimated range obtained by using all the measured data that has been acquired up until the time slot number tk. Thus, the smaller the difference between the estimated ranges 303 and 305 is, the higher the prediction accuracy becomes. In other words, the smaller the difference between the estimated ranges 303 and 305 is, the lower the information value becomes.

This is because, even if the server 20 does not acquire the group of measured data 304, the server 20 can accurately predict the target data by using its prediction function (prediction module) equivalent to that of the information value estimation unit 106. Namely, such measured data having a low information value can be considered to be non-urgent measured data.

To quantify the difference between the estimated ranges 303 and 305, the distance between both of the distributions can be obtained by using Kullback-Leibler divergence DKL. Assuming that the estimated distribution obtained before the group of measured data 304 is acquired is Φ1 and the estimated distribution obtained after the group of measured data 304 is acquired is Φ2, the divergence obtained by the group of measured data 304 is given by DKL(Φ2//Φ1).

If estimation of data x is indicated by a distribution function F(x), DKL(Φ2//Φ1) can be approximated by a Gaussian function N (μ,Σ) using the corresponding expected value μ and variance-covariance matrix Σ. For example, if target measured data is position information (coordinate values on the two-dimensional Euclidean space), μ represents the expected position and Σ represents uncertainty of the position. If there are two estimations of Φ1=N (μ1, Σ1) and Φ2=N (μ2, Σ2), the distance to the estimation Φ2 from the estimation Φ1 can be evaluated by the following mathematical expression (1).

$$DKL(\phi 1\|\phi 2) = \frac{1}{2}\left[\mathrm{Ln}\frac{|\Sigma_1|}{|\Sigma_2|} - N + tr\left\{\Sigma_1^{-1}\Sigma_2\right\} + (\mu_2 - \mu_1)^T \Sigma_1^{-1}(\mu_2 - \mu_1)\right] \quad (1)$$

In the above mathematical expression (1), tr(A) represents the trace of a matrix A, and N represents the dimension number. The larger the value obtained by the above mathematical expression (1) is, the higher the information value becomes. In this way, the magnitude of the information value can be obtained by estimating a state with target measured data and a state without the target measured data and by calculating the difference in the distance between predicted and estimated data distributions determined by both the state estimation results.

Per determination data, the data transmission control unit 107 determines timing at which the corresponding measured data is transmitted, by using the corresponding information value calculated by the information value estimation unit 106 and the corresponding transmission cost obtained by the control signal management unit 105. The data transmission control unit 107 may collectively transmit measured data that has been accumulated up until the current time since measured data is transmitted last (stop/go control). Alternatively, the data transmission control unit 107 may select and transmit important measured data. The importance of measured data can be determined by causing the information value estimation unit 106 to calculate the subset of the measured data that has been accumulated up until the current time and to calculate the information value of the subset. However, for simplicity, the present exemplary embodiment will be described assuming that the data transmission control unit 107 transmits the measured data that has been accumulated up until the current time since measured data is transmitted last.

Before transmitting measured data, the data transmission control unit 107 gives an importance attribute to the measured data, so that the server 20 can distinguish measured data having high importance from measured data having low importance. In the following description, measured data having high importance is provided with an importance attribute "M." In addition, among the untransmitted measured data, measured data having low importance is provided with an importance attribute "L."

The measured data provided with an importance attribute "M" is important when used. Whether measured data needs to be provided with an importance attribute "M" is determined by a policy of a designer (a policy for determining the importance attribute is determined in advance). For example, there are cases in which a terminal 10 determines to transmit measured data to the server 20 after a relatively long period of time elapses since the terminal 10 transmitted measured data last. In such cases, in accordance with one conceivable policy, the terminal 10 gives an importance attribute "M" to the measured data corresponding to the timing (time slot) at which the terminal 10 determines to transmit the measured data or to the measured data at the timing (time slot) immediately before the timing (time slot). This is because, since the terminal 10 has not transmitted any measured data for a long time, the server 20 is caused to promptly detect the magnitude of the change from the measured data at the previous timing (time slot). The measured data other than the measured data provided with an importance attribute "M" is provided with an importance attribute "L."

The data transmission control unit 107 determines whether to transmit measured data on the basis of the magnitude of the information value V and a transmission cost P. For example, the data transmission control unit 107 may perform statistical processing on the magnitude of the information value V and the transmission cost P and calculate transmission probability. In this way, depending on the transmission probability, the data transmission control unit 107 determines whether to transmit the measured data. Normally, the larger the magnitude of the information value V is and the smaller the transmission cost P is, the higher the transmission probability needs to become. Thus, the transmission probability is represented by a monotonically increasing function with respect to V and a monotonically decreasing function with respect to P. For example, transmission probability G (V, P) can be calculated by the following mathematical expression (2). However, the calculation method of the transmission probability is not limited to the mathematical expression (2).

$$G(V, P) = \frac{1}{1 + (1-\alpha)e^{-\beta\frac{V}{P}}} \quad (2)$$

In the mathematical expression (2), $\alpha$ and $\beta$ are adjustable parameters. The adjustable parameters $\alpha$ and $\beta$ may be predetermined values or may be values that can dynamically be changed by the terminal 10 or the server 20. By dynamically changing the adjustable parameters $\alpha$ and $\beta$, the data transmission control unit 107 can achieve further detailed dynamic adjustment of the transmission timing.

Figure 7:
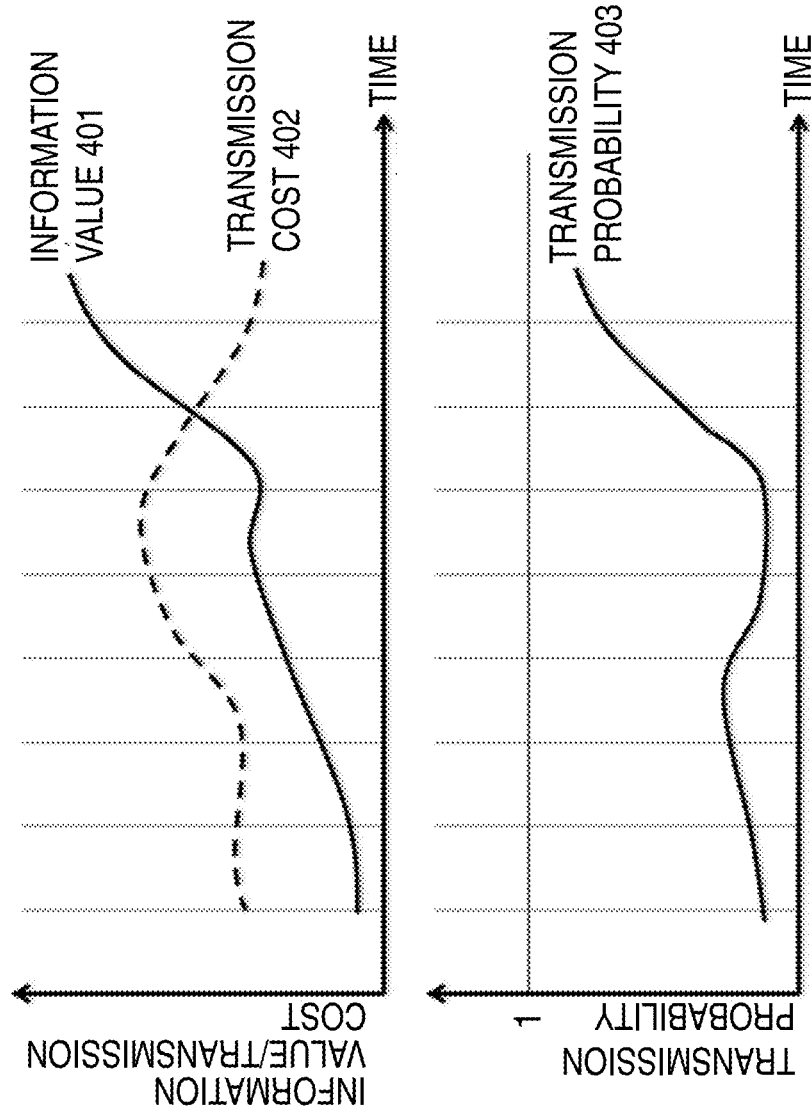
FIG. 7A illustrates an example of change of an information value 401 and a transmission cost 402 over time and FIG. 7B illustrates an example of change of corresponding transmission probability 403 over time.

FIG. 7A illustrates an example of change of an information value 401 and a transmission cost 402 over time and FIG. 7B illustrates an example of change of corresponding transmission probability 403 over time. Normally, since the prediction accuracy deteriorates over time, the information value is improved. In contrast, since the transmission cost 402 is a value determined by a control signal acquired from the server 20, the transmission cost 402 does not have any particular tendency (the transmission cost 402 can be any value). As illustrated in FIGS. 7A and 7B, the higher the information value 401 is and the lower the transmission cost 402 is, the higher the transmission probability 403 becomes. In this way, the terminal 10 determines whether to transmit measured data on the basis of the transmission probability, which is represented by a decreasing function with respect to the transmission cost and an increasing function with respect to the information value. Thus, the data transmission control unit 107 determines whether to transmit measured data on the basis of the transmission probability 403.

Alternatively, instead of determining whether to transmit measured data on the basis of the determination of the transmission probability, the data transmission control unit 107 may optimize the transmission timing on the basis of the relationship between the information value and the transmission cost. For example, the transition of the prediction of the magnitude of the information value V from the current time and the transition of the prediction of the transmission cost P may be calculated. In such case, the difference (V−γP) between the calculated transitions of the predictions or the time (time slot) at which a statistic such as V/P is maximized is searched for. In this way, the measured data is transmitted at the found time. An appropriate coefficient value is selected for γ. A more specific case in which the control signal management unit 105 receives transmission cost information P[X] at a location as a control signal will be described. In this case, when predicting a time-varying movement track X[t], the transmission cost at certain time t can be calculated as P[X[t]]. If change of the magnitude of the information value V over time can be predicted, the prediction result can be used. However, if change of the magnitude of the information value V over time cannot be predicted, the current magnitude of the information value V is used.

Alternatively, normally, since the magnitude of the information value V tends to increase over time (the prediction accuracy deteriorates over time), by using an appropriate increasing function with respect to time, the time (time slot) at which a statistic such as the above difference is maximized can be calculated. However, normally, even when the transmission cost of measured data is high, it is desirable that the measured data be transmitted at certain intervals in order to maintain a certain level of quality. In such case, it is desirable that the terminal be caused to transmit measured data after a certain number of time slots since measured data is transmitted last.

The terminals 10 (the respective control signal management units 105) can be configured to receive regularly updated control signals if the downlink network band from the server 20 to the terminals 10 is not limited. However, if use of the downlink network band also needs to be reduced, for example, the server 20 may transmit control signals to terminals 10 when measured data is uploaded by the terminals 10. This is because it is often the case that the data collection and management system has sufficient resources and the downlink network band is not tight when measured data is transmitted from terminals 10.

Next, an operation of a terminal 10 will be described.

Figure 8:
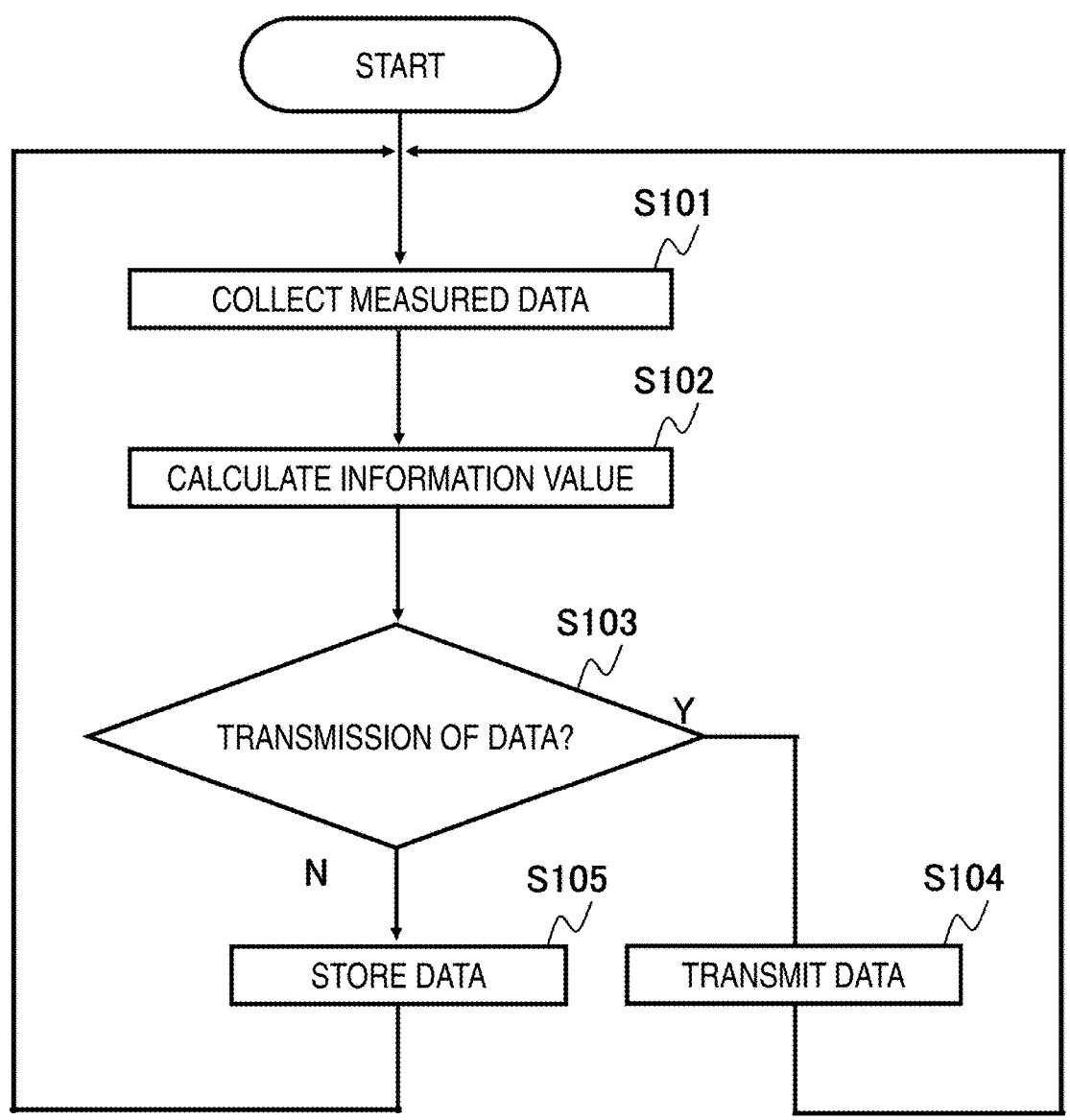
FIG. 8 is a flowchart illustrating an example of an operation performed by the terminal 10.

FIG. 8 is a flowchart illustrating an example of an operation performed by a terminal 10.

In step S101, the data collection unit 103 collects measured data. The data collection unit 103 registers the collected data in the data management unit 104 as data structured on the basis of the corresponding attribute (determination data or dependent data).

In step S102, the information value estimation unit 106 calculates an information value by using determination data.

In step S103, the data transmission control unit 107 determines whether to transmit the measured data on the basis of the transmission cost obtained from the control signal management unit 105 and the information value calculated by the information value estimation unit 106.

If the data transmission control unit 107 determines to perform "data transmission" (Yes in step S103), the data transmission control unit 107 transmits the determination data and the corresponding dependent data to the server 20, and the processing returns to step S101 (step S104). Otherwise (No in step S103), the data is accumulated within the terminal 10, and the processing returns to step S101 (step S105).

Next, an operation of an individual unit included in the server 20 will be described.

The server 20 holds measured data transmitted from the terminals 10 in the database 206 and manages the measured data so that various applications can use the measured data. By causing an individual terminal 10 to perform data transmission control on measured data, marking information about an importance attribute is added to the measured data. The server 20 preferentially stores measured data having higher importance, in accordance with such marking information about an importance attribute. Namely, depending on the importance of the measured data transmitted from the terminals 10, the server 20 preferentially allocates resources (for example, a hard disk). In this way, the server 20 preferentially stores measured data, which has been transmitted from the terminals 10 preferentially over other measured data. Consequently, since the server 20 intermittently stores measured data, when managing the measured data, the server 20 needs to interpolate or estimate other measured data. In addition, the server 20 transmits control signals to the terminals 10.

The data reception unit 203 acquires measured data uploaded by an individual terminal 10 via the communication unit 201 and outputs the measured data to the data management unit 205. The data management unit 205 registers the measured data acquired from an individual terminal 10 in the database 206. When registering the measured data, in addition to the measured data and the measurement time of the measured data, the data management unit 205 also stores a time slot number, a type indicating determination or dependent data, and an importance attribute, per terminal (per terminal identifier).

The control signal management unit 202 notifies an individual terminal 10 of transmission cost information by transmitting a control signal to the terminal 10. The control signal management unit 202 regularly generates and updates a control signal in view of the current data acquisition status, the load status of the server 20, the prediction and estimation status of unreceived measured data, and the like. An individual terminal 10 needs the control signal to calculate a transmission cost. What is used as the transmission cost depends on a policy of a designer. For example, the following description will be made assuming that information about the density of terminals 10 at an individual area is used as the control signal so that a plurality of terminals 10 do not simultaneously transmit measured data. In an area where terminals 10 densely exist, many measured data are transmitted from the area. Thus, the control signal management unit 202 generates a control signal so that the transmission cost is increased accordingly. Thus, the transmission cost information is an index that reflects how intensely the measured data uploaded by terminals 10 consumes resources. The control signal management unit 202 manages the transmission cost information so that the value corresponding to the transmission cost information is increased as concentration degree of resources amount increases.

More specifically, a field (map) is divided into small areas, and the number of terminals N[i] in an area i (hereinafter, i is an integer) is calculated. In addition, for example, an appropriate upper limit C is determined, and a value defined within [0, 1] such as min (1, N[i]/C) is used as the control signal (transmission cost) in the area i. If there is no problem with the data transmission amount, the server 20 may transmit a control signal relating to all the areas to each terminal 10. Alternatively, using the current position of the control signal transmission target terminal 10 as a center, an appropriate radius may be determined, and a control signal relating to the areas included in the circle formed by the radius may be transmitted.

The control signal management unit 202 may transmit a control signal regularly. Alternatively, when the data reception unit 203 receives measured data, the control signal management unit 202 may transmit a control signal (updated control signal) to the terminal 10. For example, when a terminal 10 receives density information as a control signal, if the density is high, the terminal 10 determines that the transmission cost is high. If the terminal 10 determines that the transmission cost is high, the transmission probability is decreased. Thus, transmission of measured data from such a dense area is reduced. As a result, a plurality of terminals 10 less compete for consumption of the resources.

In many cases, the data managed by the server 20 is measured data that has been intermittently collected. Namely, while measured data having high importance (measured data having an importance attribute "M") is collected promptly, acquisition of measured data having low importance (measured data having an importance attribute "L") depends on when the terminal 10 transmits the measured data. For example, if a terminal 10 performs stop/go control in which the terminal 10 transmits all the measured data accumulated since measured data is transmitted last, the server 20 acquires the past measured data collectively at that transmission timing. In addition, if a terminal 10 performs a complex determination operation on the importance of measured data and selectively transmits data having high importance, the server 20 cannot determine when the terminal 10 transmits measured data having low importance.

Thus, for example, if the server 20 needs untransmitted measured data when analyzing measured data, the server 20 causes the data estimation unit 204 to operate on-demand and estimate necessary data. If an estimation result is not sufficiently accurate, the data estimation unit 204 may collect necessary measured data from a relevant terminal via the communication unit 201.

The data estimation unit 204 uses the same estimation algorithm as that used by an individual terminal 10 for calculating an information value. In addition, instead of discarding measured data that has been estimated once, the data estimation unit 204 adds an importance attribute "E" to the measured data and registers the measured data in the database 206. By adding an importance attribute "E," the data estimation unit 204 explicitly indicates that the data is estimated information. If the same measured data is accessed next time, the data management unit 205 reuses the estimated measured data unless there are some special reasons.

Figure 9A:
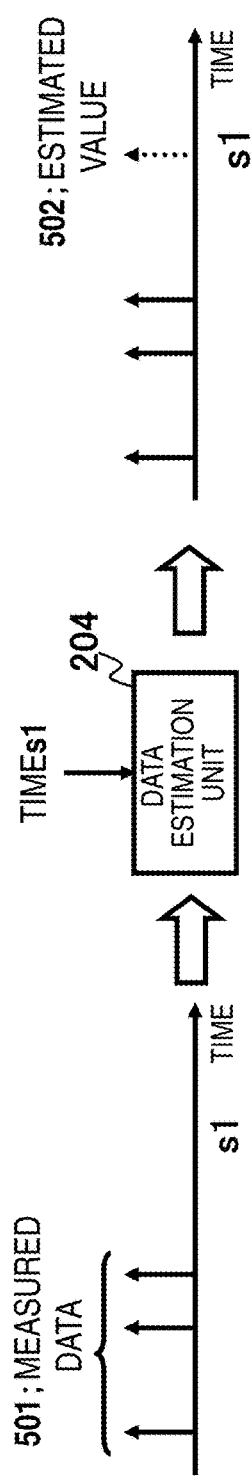
FIGS. 9A and 9B illustrate concept of data estimation performed by a data estimation unit 204.
Figure 9B:
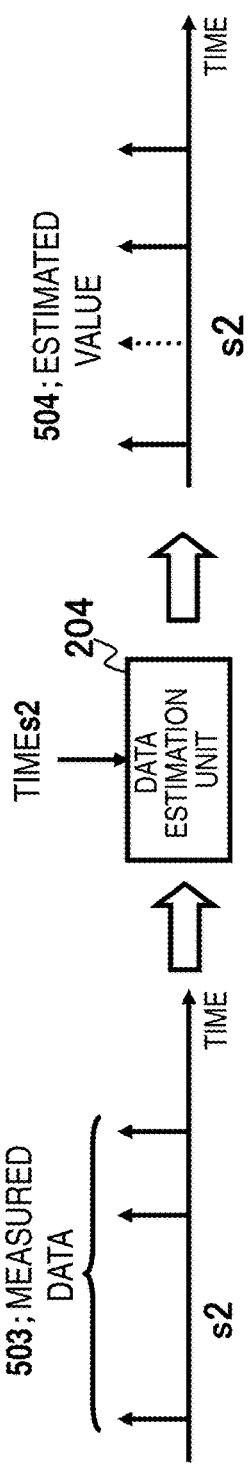

For example, specific cases will be described with reference to FIGS. 9A and 9B. Assuming that measured data 501 is arranged in a time-series manner and a request for data at a future time slot s1 is made, the data estimation unit 204 uses measured data in the past to generate an estimated value 502 at the time slot s1 (see FIG. 9A).

If a request for data at a past time slot s2 is made, the data estimation unit 204 can also estimate the requested measured data. Such case will be described with reference to FIG. 9B. In FIG. 9B, while there is measured data 503, the server 20 has not received information at a time slot in the past time slots. Even when such unreceived measured data at the time slot s2 is requested, the data estimation unit 204 can estimate an estimated value 504 at the time slot s2 by using the measured data 503 that has already been acquired.

Normally, with new measured data, more accurate estimation can be performed. Thus, if higher accuracy is needed, the data estimation unit 204 may be configured to hold information indicating whether new measured data has been inputted since the last data estimation operation. In this way, when receiving a data access request requiring high-precision estimation, the data estimation unit 204 discards estimated data and generates newly estimated data.

It is desirable that better access performance (for example, the access rate) be provided to measured data having high importance (importance attribute "M"), compared with estimated data (importance attribute "E") and measured data (importance attribute "L") transmitted belatedly. For example, it is desirable that a database including an index for the importance attributes be configured so that measured data having an importance attribute "M" can be acquired promptly. Alternatively, another database may separately be configured in which only the measured data having an importance attribute "M" is stored.

Next, a series of operations, including the acquisition of measured data, estimation of measured data, and overwriting of measured data, will be described with reference to FIG. 10. The following description will be made by using transition of position information as an example. Terminal-side data 620 illustrated in FIG. 10 is a sequence of position information estimated points. Data classified into measured data having an importance attribute "M" and measured data having an importance attribute "L" are transmitted to the server 20. First, among the terminal-side data 620, promptly transmitted data 601 and 602 having an importance attribute "M" are sequentially transmitted as server-side data 630. Thus, the server 20 stores priority data 631 only and performs linear interpolation for the other data.

Next, if data at a time slot between measured data having an importance attribute "M" is requested, the server 20 performs data estimation to generate measured data (having an importance attribute "E"). In FIG. 10, interpolated data 621 has been generated. FIG. 10 illustrates an example in which the server 20 performs data estimation through linear interpolation, and therefore, the corresponding measured data are connected by a supplementary line. Next, if the measured data at the corresponding time slot is transmitted belatedly from the terminal, the server 20 performs data updating 633 in response to the data uploading. In this data updating 633, the server 20 overwrites the interpolated data 621 with the received data (measured data) having an importance attribute "L." The server 20 performs like processing on the other measured data and estimates data on-demand. In this way, the server 20 can update information when measured data is updated by an individual terminal 10.

If the server 20 needs an actually measured value from a terminal 10, the server 20 may explicitly request the terminal 10 to transmit the necessary measured data on-demand, instead of estimating the data. This is performed only in the data updating 633 in response to data uploading.

Each unit included in the server 20 may be realized by a computer program that causes a computer included in the server 20 to use hardware of the computer and to perform processing described in detail below.

Next, an operation of the server 20 will be described.

Figure 11:
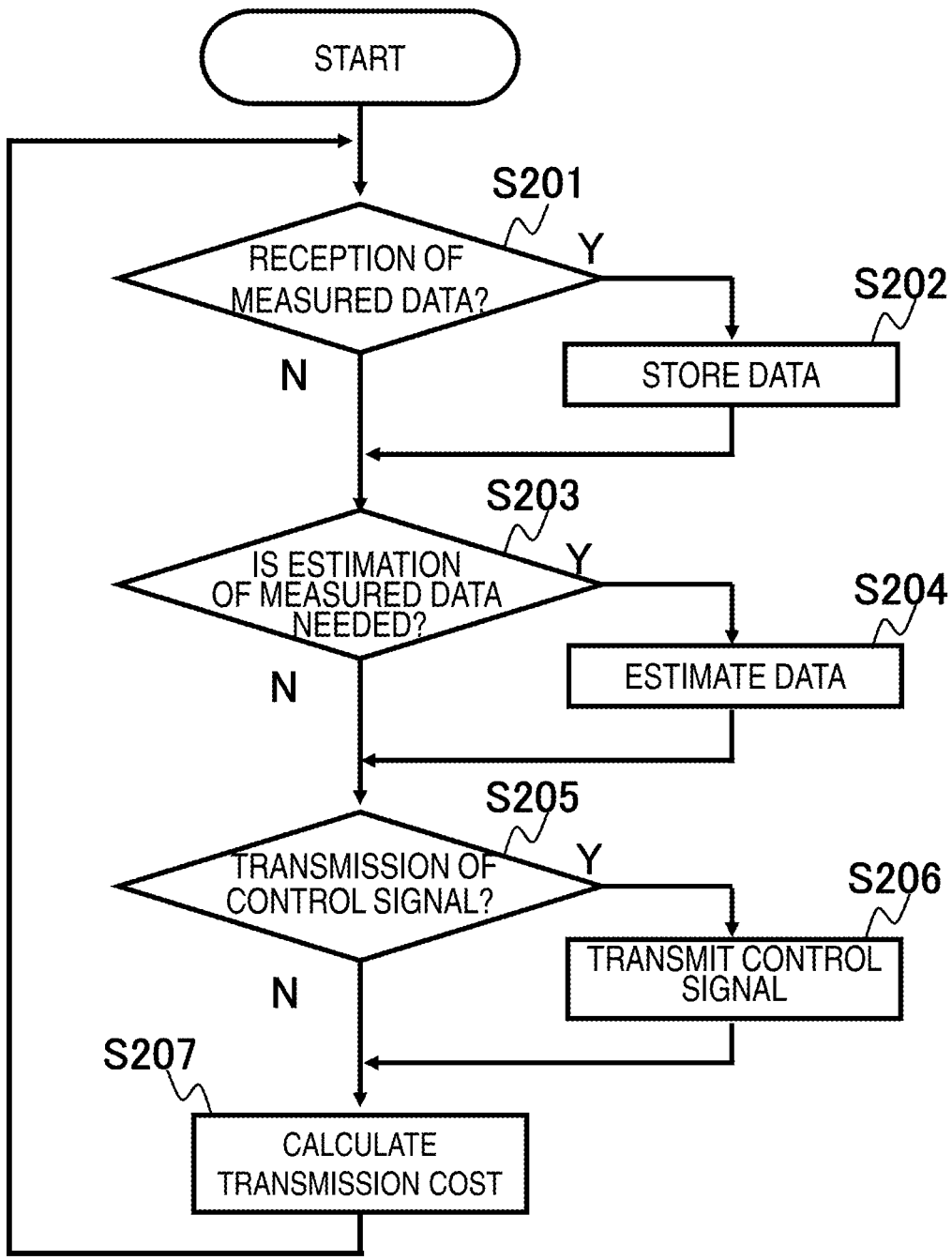
FIG. 11 is a flowchart illustrating an example of an operation performed by the server 20.

FIG. 11 is a flowchart illustrating an example of an operation performed by the server 20. The operation of the server 20 illustrated in FIG. 11 is merely an example. Thus, for example, the processing execution order is not limited. In addition, individual processing does not need to be performed linearly. For example, the measured-data reception processing (step S201, step S202) and the control signal transmission processing (step S205, step S206) may be performed in parallel.

In step S201, the data reception unit 203 determines whether the server 20 has received measured data from a terminal 10. If the server 20 has received measured data (Yes in step S201), the data reception unit 203 stores the measured data in the database 206 via the data management unit 205 (step S202).

In step S203, the data estimation unit 204 determines whether estimation of measured data is needed. If estimation of measured data is needed (Yes in step S203), the data estimation unit 204 performs data estimation by using data stored in the database 206 (step S204).

In step S205, the control signal management unit 202 determines whether a condition(s) for transmitting a control signal is met. If such a condition(s) is met (Yes in step S205), the control signal management unit 202 transmits a control signal to an individual terminal 10 via the communication unit 201 (step S206). Next, the control signal management unit 202 calculates transmission cost information (step S207).

As described above, in the data collection and management system according to the present exemplary embodiment, an individual terminal 10 selectively transmits measured data having high importance to the server 20, and the server 20 includes a function corresponding to selection and transmission of measured data having high importance. An individual terminal 10 classifies collected measured data into determination data or data dependent thereon. If the measured data is determined to be determination data, the terminal 10 determines whether to transmit the measured data on the basis of the importance thereof. In this way, the terminal 10 enables dynamic upload control (dynamic data transmission control). The importance is determined on the basis of how much an analysis result obtained by the server 20 is affected. Typically, an index that represents whether interpolation can be performed by prediction is used. Such determination data that has been determined to be important through the importance determination processing and the corresponding dependent data are promptly transmitted to the server 20. In contrast, if determination data that has been determined to be non-urgent through the importance determination processing and the corresponding dependent data are temporarily stored in the terminal 10, and the data is transmitted to the server 20 when the terminals 10 less compete for the resources.

The server 20 holds data having high importance and data having low importance separately and optimizes a configuration so that the performance of the access to the data having high importance is maximized. In addition, for example, when performing any analysis using measured data, there are cases in which the server 20 needs unreceived data. In such cases, the server 20 performs data interpolation by performing data estimation while using data that has already been received. In addition, the server 20 requests terminals 10 to coordinate with each other by transmitting control signals to the terminals 10. For example, a control signal transmitted by the server 20 is an index with which a terminal 10 can quantify a transmission cost, such as the density of terminals at an individual area. For example, the larger the transmission cost is, the lower the transmission probability of the terminal 10 becomes. Namely, an individual terminal 10 determines whether to transmit data on the basis of the balance between the corresponding information value and transmission cost required to transmit the data.

With the above configurations and the functions of the individual apparatuses, the data collection and management system according to the present exemplary embodiment provides the following advantageous effects.

The first advantageous effect is that the resource use efficiency is improved. According to the techniques in the above PTLs, since terminals independently collect and upload data, the terminals complete for the resources. Namely, the techniques in the above PTLs do not take into consideration, for example, the dynamically changing impact of competing for use of the resources by a plurality of terminals. For example, in an area where traffic congestion is being caused, many vehicles could upload data and compete for the network band or the server resources. Thus, according to the techniques in the above PTLs, in order to maintain at least a certain level of service quality, capacity design needs to be performed on the basis of the resource use peak value. However, with such countermeasures, a lot of resources are not used other than in peak hours. Thus, the resource use efficiency is deteriorated, which is counted as a problem. To avoid this, it is desirable that non-urgent data having low data importance be collectively transmitted and managed when the resource use rate is low, not when the terminals are competing for the resources.

An individual terminal 10 according to the present exemplary embodiment preferentially uploads measured data in descending order of importance. As a result, since data having high importance preferentially consumes the resources, the limited resources can effectively be used. Namely, the resource use efficiency is improved.

The second advantageous effect is that the calculation processing time is improved. According to the techniques in the above PTLs, when calculation using accumulated data is performed for analysis or the like, much calculation time could be needed. This is because the techniques in the above PTLs equally treat data that affects more and data that affects less on an analysis result when performing calculation processing using accumulated data for analysis or the like. Normally, the calculation time largely depends on the data amount. If a large amount of data is processed, the calculation time is increased exponentially. In addition, in many cases, the data processing time can be expressed by a non-linear function with respect to the data amount. For example, the rate of access to data is nonlinearly decreased as the data amount is increased. In addition, the time required for complex analysis such as multivariable analysis or cluster analysis is also nonlinearly increased as the data amount is increased. Thus, it is desirable that important data be selectively treated and that the data amount be reduced as much as possible.

In the database 206 of the server 20 according to the present exemplary embodiment, measured data having high importance is sequentially stored. Since measured data includes a marking representing importance, measured data used for a target operation can be selected and the effective size of the data amount can be reduced. As a result, the calculation processing time can be shortened.

The third advantageous effect is that the resource amount necessary for achieving the target performance can be reduced. According to the techniques in the above PTLs, the resource amount necessary to ensure the designed performance is increased, and idle and surplus resources are increased, which is counted as a problem. For example, if terminals simultaneously use the resources, since the terminals compete for use of the resources, the resource use amount is increased in a burst manner. Thus, to maintain a certain level of quality, it is necessary to design the resources on the basis of their peak values. However, since such a peak appears only in some time periods of the entire period, large surplus resources are caused in most time periods.

Since the server 20 according to the present exemplary embodiment can store received measured data in a database and can process non-urgent data as a batch when in a low load state, unnecessary concentration on the network band or database storage processing can be avoided. As a result, the necessary resource amount can be reduced.

[Second Exemplary Embodiment]

Next, a second exemplary embodiment will be described in detail with reference to the drawings.

A data collection and management system according to the present exemplary embodiment is a system in which vehicle information such as about automobiles is collected and managed.

A vehicle such as an automobile includes an OBD2 (On-board diagnostics) system. The OBD2 system is a system for managing vehicle management information such as about the number of revolutions of the engine or values of various types of sensors. In the OBD2 system, various types of data (which will hereinafter be referred to as OBD data) can be acquired through an OBD interface.

By analyzing the OBD data transmitted from a vehicle, a management server analyzes the driving status or malfunction condition of the vehicle. On the basis of the analysis result, the management server can provide various types of information provision services. Examples of the services include displaying fuel consumption of a running vehicle, displaying traffic congestion information, providing information about a vehicle that has caused an accident to surrounding vehicles. In addition, while the present exemplary embodiment will be described assuming that collected data is OBD data relating to vehicles, various types of sensors may be arranged in infrastructure facilities such as traffic signals, street lights, parking areas, and various types of stores, and information obtained from these sensors may be used. As a result, more services of various types can be provided. For example, it is possible to provide a service in which a vehicle is guided to a parking area having an available spot (or a spot that could be available) on the basis of a sensor(s) that detects an available spot(s) and information about a running vehicle(s) (information about the position(s) and speed(s) of a vehicle(s)).

In order to provide analysis at the right timing and accurately in ever-changing circumstances (available spots in a parking area, the number of vehicles going to such a parking area, etc.), it is necessary to selectively process important data. The data collection and management system according to the present exemplary embodiment provides such functions. In the present exemplary embodiment, when the management server uses OBD data, an individual vehicle preferentially uploads important information to the management server. In addition, in the present exemplary embodiment, a data collection and management system that relates to vehicle data will be described. In the data collection and management system, the peak of an individual resource consumption amount (the network band, the capacity of a database, etc.) is reduced by preventing vehicles from simultaneously updating data.

Figure 12:
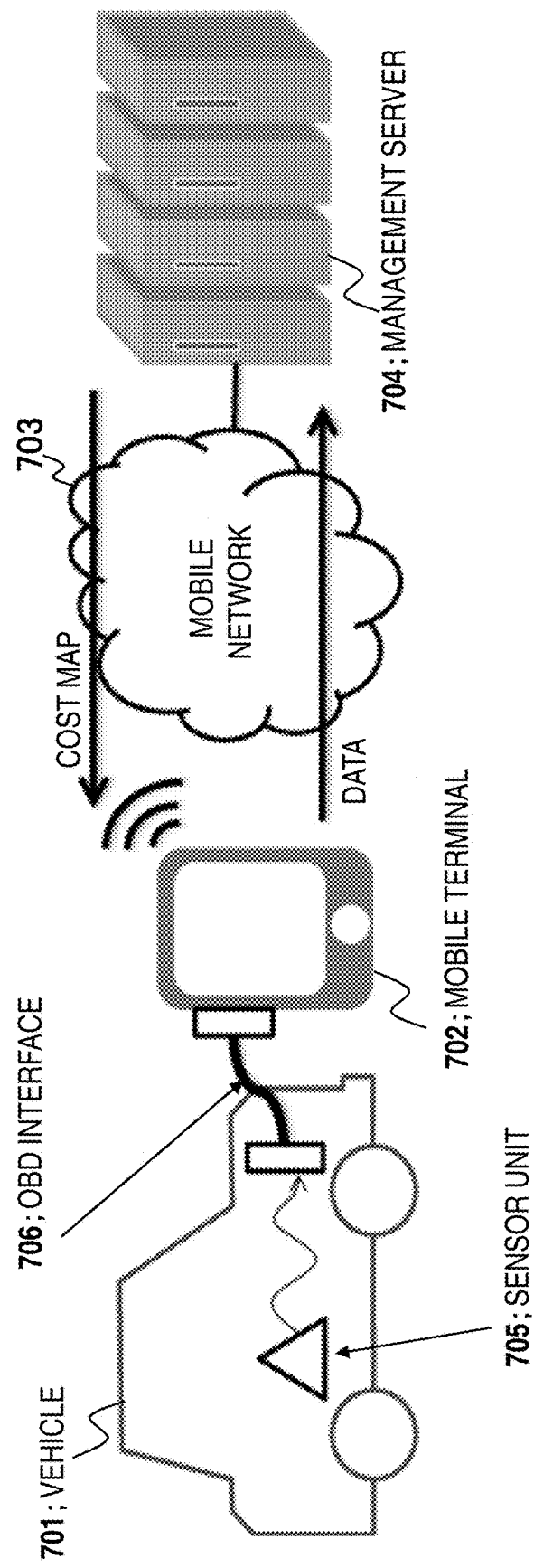
FIG. 12 illustrates an example of a configuration of a vehicle data collection and management system according to a second exemplary embodiment.

FIG. 12 illustrates an example of a configuration of a vehicle data collection and management system according to the present exemplary embodiment. As illustrated in FIG. 12, the vehicle data collection and management system includes a vehicle 701 such as an automobile, a mobile terminal 702 such as a smartphone, a mobile network 703, and a management server 704.

The vehicle 701 includes a sensor unit 705 that acquires vehicle data and an OBD interface 706. The sensor unit 705 measures vehicle position data by using a GPS (Global Positioning System). In addition, the sensor unit 705 can acquire various types of other data such as about the number of revolutions of the engine and about the moving speed. In the present exemplary embodiment, vehicle position data and various types of data other than the vehicle position data will collectively be referred to as OBD data. In addition, the vehicle position data and the other OBD data will be determined to be determination data and dependent data, respectively.

The mobile terminal 702 acquires these data (OBD data; determination data and dependent data) via the OBD interface 706. More specifically, by transmitting a data transmission request to an ECU (Engine Control Unit) of the vehicle, the mobile terminal 702 acquires OBD data.

The mobile terminal 702 includes a CPU (Central Processing Unit) and a storage unit in which a program performed by the CPU is stored. By causing the CPU to perform a program, the mobile terminal 702 calculates the information value of the position information while regularly acquiring vehicle data. In addition, while evaluating the importance of data, the mobile terminal 702 controls transmission of the data to the management server 704. Namely, the mobile terminal 702 uploads data to the management server 704 via the mobile network 703 while performing dynamic timing control.

A control signal used for the data transmission control by the mobile terminal 702 is acquired simultaneously with uploading of data to the management server 704. In addition, the control signal is a cost map ρ [k] (k is a number of a small area), which is transmission cost information about an individual small area in one of the squares in a map formed as a square grid.

Figure 13:
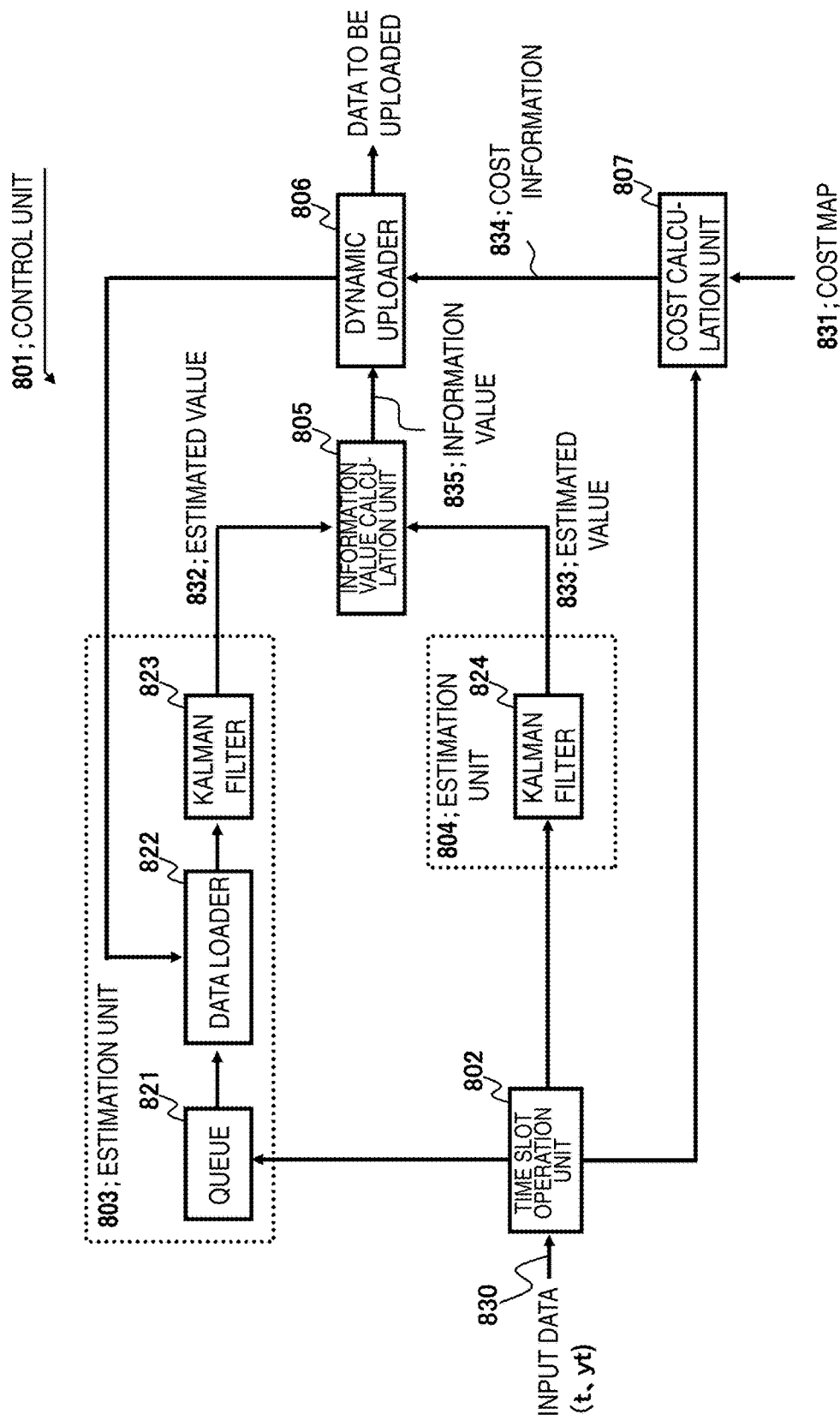
FIG. 13 illustrates an example of an internal configuration of a control unit 801 included in a mobile terminal 702.

FIG. 13 illustrates an example of an internal configuration of a control unit 801 included in the mobile terminal 702. By causing the CPU to perform a program, the mobile terminal 702 realizes functions of the control unit 801 that will be described with reference to FIG. 13. Hereinafter, an operation will be described with reference to FIG. 13. In this operation, when new determination data is inputted, its information value is determined, and data transmission control is performed. For ease of description, the following description will be made assuming that vehicle position data determined to be determination data will be used as input data. However, other OBD data determined to be the corresponding dependent data is also transmitted when the vehicle position data is transmitted. In addition, the input data is inputted regularly at certain time intervals and the time slots are defined by the intervals.

The control unit 801 performs data transmission control by using input data (t, yt) 830, which is a combination of the current time and vehicle position data, and a cost map 831, which is transmission cost information obtained from the management server 704.

The control unit 801 includes a time slot operation unit 802, two estimation units 803 and 804, an information value calculation unit 805, a dynamic uploader 806, and a cost calculation unit 807.

The time slot operation unit 802 calculates an internally managed time slot number from the time of the input data 830 and adds the time slot number to the input data 830. Next, the time slot operation unit 802 outputs the input data 830 to a queue 821 included in the estimation unit 803, a Kalman filter 824 included in the estimation unit 804, and the cost calculation unit 807.

The estimation units 803 and 804 include Kalman filters 823 and 824 having the same functions, respectively. The estimation units 803 and 804 use the respective Kalman filters to estimate a state at a time slot s. At each time slot, the estimation unit 804 receives the input data 830, estimates a state, and outputs an estimated value 833. The estimation unit 803 temporarily buffers the input data 830 in the queue 821 and outputs an estimated value 832 by using data loaded last by a data loader 822.

The estimation unit 804 applies the Kalman filter 824 to the inputted vehicle position data y[s] at a time slot s and calculates internal state x2[s] and its variance-covariance matrix Σ2[s] by using x2[s−τ] and Σ2[s−τ] τ time slots ago (for example, τ=1) on the basis of the following mathematical expressions (3) and (4).

$$x_2^-[s]=F(\tau)x_2^-[s-\tau] \tag{3}$$

$$\Sigma_2^-[s]=F(\tau)\Sigma_2^-[s-\tau]F(\tau)^T+Q(\tau) \tag{4}$$

F(τ) and Q(τ) are represented by the following mathematical expressions (5) and (6). In addition, σ1 and σ2 are parameters that define the sizes of process noises and are positive real numbers.

$$F(\tau) = \begin{pmatrix} 1+\tau & 0 & -\tau & 0 \\ 0 & 1+\tau & 0 & -\tau \\ \tau & 0 & 1-\tau & 0 \\ 0 & \tau & 0 & 1-\tau \end{pmatrix} \tag{5}$$

$$Q(\tau) = \begin{pmatrix} \rho_1\tau & 0 & 0 & 0 \\ 0 & \rho_2\tau & 0 & 0 \\ 0 & 0 & 0 & 0 \\ 0 & 0 & 0 & 0 \end{pmatrix} \tag{6}$$

Alternatively, the internal state x2[s] and its variance-covariance matrix Σ2[s] may be calculated by using vehicle position data y[s] on the basis of the following mathematical expressions (7) and (8).

$$x_2^-[s]=x_2^-[s]+\Sigma_2^-[s]H^T(H\ \Sigma_2^-[s]H^T+R)^{-1}(y[s]-Hx_2^-[s]) \tag{7}$$

$$\Sigma_2^-[s]=(I-\Sigma_2^-[s]H^T(H\ \Sigma_2^-[s]H^T+R)^{-1}H)\Sigma_2^-[s] \tag{8}$$

In the above mathematical expressions (7) and (8), H and R are represented by the following mathematical expressions (9) and (10), and I is a unit matrix.

$$H = \begin{pmatrix} 1 & 0 & 0 & 0 \\ 0 & 1 & 0 & 0 \end{pmatrix} \tag{9}$$

$$R = \begin{pmatrix} \lambda_1 & 0 \\ 0 & \lambda_2 \end{pmatrix} \tag{10}$$

In addition, λ1 and λ2 are parameters that specify the sizes of measurement noises and are positive real numbers. The internal state x2[s] and its variance-covariance matrix Σ2[s] are outputted as the estimated value 833 and held until a state at the next time slot s+1 is estimated. The internal state is a four dimension vector, and the variance-covariance matrix is a 4×4 matrix.

The estimation unit 803 inputs new input data 830 to the queue 821 at each time slot and holds input data in chronological order.

When the data loader 822 receives a data load command from the dynamic uploader 806, the data loader 822 inputs all the data held in the queue 821 to the Kalman filter 823 without changing the order of the data. The data loader 822 does not perform any particular operation unless the data loader 822 receives a data load command from the dynamic uploader 806.

The Kalman filters 823 and 824 have the same configuration. However, since the Kalman filter 823 does not have the new data input, the Kalman filter 823 calculates an estimated value at the time slot s on the basis of an internal state x1 [s−k], which is calculated when the last data input is made (at a time slot s-k), and its variance-covariance matrix Σ1[s−k]. The Kalman filter 823 uses the above mathematical expressions (3) and (4) and outputs the estimated value x1−[s] and Σ1−[s] as the estimated value 832. The mathematical expressions (7) and (8) are not used since the measured data y[s] is not present.

The management server 704 includes an estimation function equivalent to the Kalman filters 823 and 824. If the same data is used for estimation, the same estimated value is obtained. Namely, even when the management server 704 is not provided with an estimated measured data, the mobile terminal 702 can determine the prediction and estimation accuracy of the management server 704.

The information value calculation unit 805 calculates the information value of the input data 830 on the basis of the estimated values 832 and 833 at the time slot s. The information value calculation unit 805 calculates the magnitude of the information value V on the basis of the above mathematical expression (1) in which the estimated values 832 and 833 are used with a Gaussian function $\Phi I=N(xi[s], \Sigma i[s])(i=1, 2)$. The information value calculation unit 805 outputs the calculated magnitude of the information value V to the dynamic uploader 806 as an information value 835.

The cost calculation unit 807 acquires the cost map 831 from the management server 704 and calculates a transmission cost required for transmission of the data as of this moment from the current position data.

A cost map 831 represents a cost value P ($\in[0, 1]$) in a small area i. The cost calculation unit 807 calculates a cost by calculating its own small area i from the current position r. The cost calculation unit 807 outputs the cost value P to the dynamic uploader 806 as cost information 834. By giving an importance attribute "M" to the data at the latest time slot and the data at the previous time slot, the data can be marked as important points characterized as change points. An importance attribute "L" is given to other data.

The dynamic uploader 806 acquires the magnitude of the information value V from the information value 835 and the cost value P from the cost information 834. The dynamic uploader 806 calculates transmission probability in accordance with the above mathematical expression (2) and determines whether to transmit the corresponding data in accordance with the calculated transmission probability. If the dynamic uploader 806 determines to transmit the data, the dynamic uploader 806 performs data transmission and filter synchronization.

The data transmission is processing for transmitting a set of OBD data, namely, the data (position data as determination data) accumulated in the queue 821 and the dependent data associated with the accumulated data, to the management server 704.

The filter synchronization is processing for synchronizing the states of the Kalman filters in the estimation units 803 and 804. More specifically, the Kalman filters are synchronized by an operation as described below. First, the dynamic uploader 806 issues a data upload command to the data loader 822. The data loader 822 inputs all the data accumulated in the queue 821 to the Kalman filter 823 in chronological order. On the basis of the mathematical expressions (3) to (10), the Kalman filter 823 sequentially updates the internal state and its variance-covariance matrix up until the time slot s and calculates the internal state x1[s] and its variance-covariance matrix $\Sigma 1[s]$. In this operation, the internal state x1[s] and its variance-covariance matrix $\Sigma 1[s]$ are caused to be the same as the internal x2[s] and its variance-covariance matrix $\Sigma 2[s]$, and the Kalman filters 823 and 824 are synchronized in the same state.

The control unit 801 of the mobile terminal 702 repeatedly performs the above operation to dynamically control data uploading. As a result, the mobile terminal 702 preferentially transmits important data to the management server 704 while avoiding competition with the other terminals.

Thus, the data collection and management system according to the second exemplary embodiment can suitably be applied to a system in which vehicle information such as about automobiles is collected and managed.

The above exemplary embodiments can partially or entirely be described but not limited to as follows.

[Mode 1]

See the data collection and management system according to the above first aspect.

[Mode 2]

The data collection and management system according to mode 1; wherein the transmission control unit preferentially transmits measured data determined to be more important on the basis of a predetermined policy over other measured data.

[Mode 3]

The data collection and management system according to mode 1 or 2;

wherein the terminal(s) further comprises a storage unit that stores attribute classification information used for classifying measured data into first measured data and second measured data that is dependent on the first measured data; and wherein the calculation unit calculates the information value of measured data classified into the first measured data.

[Mode 4]

The data collection and management system according to any one of modes 1 to 3;

wherein the transmission control unit calculates transmission probability of measured data by performing statistical processing on the information value and the transmission cost information and transmits the measured data to the management apparatus in accordance with the transmission probability.

[Mode 5]

The data collection and management system according to any one of modes 1 to 4;

wherein, on the basis of measured data that has already been acquired prior to first timing at which measured data, for which the information value is calculated, is acquired, the calculation unit calculates a first probability distribution of measured data at a timing at or after the first timing;

wherein, on the basis of measured data that has already been acquired up until the first timing inclusive, the measured data including the measured data acquired at the first timing, the calculation unit calculates a second probability distribution of measured data at a timing at or after the first timing; and wherein the calculation unit calculates the information value of measured data on the basis of a distance between the first probability distribution and the second probability distribution.

[Mode 6]

The data collection and management system according to any one of modes 1 to 5;

wherein the management apparatus further comprises a transmission cost management unit that increases a value representing the transmission cost information as concentration degree of resources amount consumed by measured data transmitted by the terminal(s) increases.

[Mode 7]

The data collection and management system according to any one of modes 1 to 6;

wherein the management apparatus further comprises an estimation unit that receives measured data preferentially transmitted from the terminal(s) over other measured data and estimates measured data that has not been received yet from the terminal(s) on the basis of the preferentially-transmitted measured data.

[Mode 8]

The data collection and management system according to any one of modes 1 to 7;

wherein the management apparatus further comprises a data management unit that stores measured data preferentially transmitted from the terminal(s) over other measured data separately from the other measured data and provides better access performance to the preferentially-transmitted measured data than the other measured data.

[Mode 9]

See the data collection and management method according to the above second aspect.

[Mode 10]

The data collection and management method according to mode 9; wherein, in the transmission control step, measured data determined to be more important on the basis of a predetermined policy is preferentially transmitted over other measured data.

[Mode 11]

The data collection and management method according to mode 9 or 10;

wherein, in the transmission control step, transmission probability of measured data is calculated by performing statistical processing on the information value and the transmission cost information and the measured data is transmitted from the terminal(s) to the management apparatus in accordance with the transmission probability.

[Mode 12]

See the terminal according to the above third aspect.

[Mode 13]

The terminal according to mode 12;

wherein the transmission control unit preferentially transmits measured data determined to be more important on the basis of a predetermined policy over other measured data.

[Mode 14]

The terminal according to mode 12 or 13;

wherein the terminal(s) further comprises a storage unit that stores attribute classification information used for classifying measured data into first measured data and second measured data that is dependent on the first measured data; and wherein the calculation unit calculates the information value of measured data classified into the first measured data.

[Mode 15]

The terminal according to any one of modes 12 to 14;

wherein the transmission control unit calculates transmission probability of measured data by performing statistical processing on the information value and the transmission cost information and transmits the measured data to the management apparatus in accordance with the transmission probability.

[Mode 16]

The terminal according to any one of modes 12 to 15;

wherein, on the basis of measured data that has already been acquired prior to first timing at which measured data, for which the information value is calculated, is acquired, the calculation unit calculates a first probability distribution of measured data at a timing at or after the first timing;

wherein, on the basis of measured data that has already been acquired up until the first timing inclusive, the measured data including the measured data acquired at the first timing, the calculation unit calculates a second probability distribution of measured data at a timing at or after the first timing; and wherein the calculation unit calculates the information value of measured data on the basis of a distance between the first probability distribution and the second probability distribution.

[Mode 17]

A terminal control method, comprising:

causing a terminal(s) to calculate an information value indicating a value of measured data as information; and causing the terminal(s) to determine whether to transmit the measured data from the terminal(s) to a management apparatus that manages measured data on the basis of transmission cost information indicating a cost incurrable upon transmitting the measured data to the management apparatus by the terminal(s) and the information value.

[Mode 18]

A program, causing a computer that controls a terminal(s) to perform:

calculation processing for causing the terminal(s) to calculate an information value indicating a value of measured data as information; and transmission control processing for causing the terminal(s) to determine whether to transmit the measured data from the terminal(s) to a management apparatus that manages measured data on the basis of transmission cost information indicating a cost incurrable transmitting the measured data to the management apparatus by the terminal(s) and the information value.

[Mode 19]

See the management apparatus according to the above fourth aspect.

[Mode 20]

The management apparatus according to mode 19, further comprising a transmission cost management unit that increases a value representing the transmission cost information as measured data transmitted by the terminal(s) consume resources more intensively.

[Mode 21]

The management apparatus according to mode 19 or 20, further comprising an estimation unit that receives measured data preferentially transmitted from the terminal(s) over other measured data and estimates measured data that has not been received yet from the terminal(s) on the basis of the preferentially-transmitted measured data.

[Mode 22]

A management apparatus control method, comprising:

causing a management apparatus to receive measured data transmitted from a terminal(s); and causing the management apparatus to notify the terminal(s) of transmission cost information indicating a cost incurrable upon transmitting measured data to the management apparatus by the terminal(s).

[Mode 23]

A program, causing a computer that controls a management apparatus to perform:

reception processing for causing the management apparatus to receive measured data transmitted from a terminal(s); and notification processing for causing the management apparatus to notify the terminal(s) of transmission cost information indicating a cost incurrable upon transmitting measured data to the management apparatus by the terminal(s).

Each of the programs in modes 18 and 23 can be recorded in a computer-readable storage medium. Examples of the storage medium include a non-transient storage medium such as a semiconductor memory, a hard disk, a magnetic recording medium, or an optical recording medium.

[Mode 24]

A data collection and management system in which a plurality of computer terminals collect measured data in a time-series manner and transmit the measured data to a server via a network and the server manages the transmitted data, wherein the server preferentially allocates resources to the measured data depending on the importance of the measured data and estimates uncollected data by using collected data as needed; wherein if necessary estimation accuracy cannot be achieved or measured data is necessary, the server collects corresponding measured data from a corresponding computer terminal on demand; wherein the server regularly updates or calculates a transmission cost from a load status of the server and a prediction and estimation status of measured data and notifies a corresponding computer terminal of the transmission cost as a control signal; and wherein an individual one of the computer terminals calculates information values of a plurality of data measured currently, obtains transmission cost information by using the control signal received from the server, determines the importance of data, and dynamically adjusts timing of transmission to the server.

[Mode 25]

The data collection and management system according to mode 24; wherein information about the position, acceleration, temperature, or humidity is at least included in the data collected by the computer terminals.

[Mode 26]

The data collection and management system according to mode 24; wherein an individual information value is an index that quantifies the magnitude of the impact caused by presence/absence of measured data; and wherein the information value of measured data is determined on the basis of the magnitude of the difference between a result obtained by prediction and estimation that uses the measured data and a result obtained by prediction and estimation that does not use the measured data, by using a prediction and estimation apparatus using measured data in the past.

[Mode 27]

The data collection and management system according to mode 24; wherein the transmission cost information is an index that reflects how intensely data uploaded by the terminals consumes resources; wherein the transmission cost is increased as the resources are consumed more intensely; and wherein the control signal is a processed and shaped signal so that an individual terminal that has received the control signal can calculate a transmission cost required to transmit the corresponding data.

[Mode 28]

The data collection and management system according to mode 27; wherein the transmission cost is a cost defined by the transmission position of the corresponding terminal; and wherein the control signal represents cost map information corresponding to the cost, and the cost map information transmitted to an individual terminal is about all areas or at least one area.

[Mode 29]

The data collection and management system according to mode 26; wherein the prediction and estimation is represented by a prediction and estimation distribution in which target data could exist;

wherein means that uses a recursive filter as typified by a Kalman filter is used, so as to estimate a state while sequentially updating an internal state without history information in the past; and wherein the information value is calculated by estimating a state with target data and a state without the target data and by calculating the difference in the distance between predicted and estimated data distributions determined by both the state estimation results.

[Mode 30]

The data collection and management system according to mode 24; wherein the transmission timing is adjusted on the basis of transmission probability, which is represented by a decreasing function with respect to the transmission cost calculated from the control signal and an increasing function with respect to the information value.

[Mode 31]

The data collection and management system according to any one of modes 24, 26 and 29;

wherein the server includes a prediction and estimation function equivalent to that of the computer terminals; and wherein, even when the server is not provided with data, an individual computer terminal can determine the prediction and estimation accuracy of the server.

The disclosure of each of the above PTLs is incorporated herein by reference thereto. Modifications and adjustments of the exemplary embodiments and examples are possible within the scope of the overall disclosure (including the claims) of the present invention and based on the basic technical concept of the present invention. In addition, various combinations and selections of various disclosed elements (including the elements in each of the claims, exemplary embodiments, examples, drawings, etc.) are possible within the scope of the entire disclosure of the present invention. Namely, the present invention of course includes various variations and modifications that could be made by those skilled in the art according to the entire disclosure including the claims and the technical concept. In particular, the present description discloses numerical value ranges. However, even if the description does not particularly disclose arbitrary numerical values or small ranges included in the ranges, these values and ranges should be deemed to have been specifically disclosed.

REFERENCE SIGNS LIST 1, 10, 10-1 to 10-$n$ terminal
2 management apparatus
20 server
30, 30-1 to 30-$m$ measurement apparatus
40 network
101 data collection interface
102 data structure information management unit
103 data collection unit
104, 205 data management unit
105, 202 control signal management unit
106 information value estimation unit
107 data transmission control unit
108, 201 communication unit
203 data reception unit
204 data estimation unit
206 database
701 vehicle
702 mobile terminal
703 mobile network
704 management server
705 sensor unit
706 OBD interface
801 control unit
802 time slot operation unit
803, 804 estimation unit
805 information value calculation unit
806 dynamic uploader
807 cost calculation unit
821 queue
822 data loader
823, 824 Kalman filter
901 notification unit
902 calculation unit
903 transmission control unit

The invention claimed is:

1. A data collection and management system, comprising:
   a terminal(s) that transmits measured data; and
   a management apparatus that receives and manages the measured data transmitted from the terminal(s),
   wherein the management apparatus comprises a notification unit that notifies the terminal(s) of transmission cost information indicating a cost incurrable upon transmitting measured data to the management apparatus by the terminal(s),
   wherein the terminal(s) comprises:
   a calculation unit that calculates an information value indicating a value of measured data as information; and
   a transmission control unit that determines whether to transmit measured data to the management apparatus based on the information value and the transmission cost information,
   wherein the transmission control unit calculates transmission probability of measured data by performing statistical processing on the information value and the transmission cost information and transmits the measured data to the management apparatus in accordance with the transmission probability.

2. The data collection and management system according to claim 1;
   wherein the transmission control unit preferentially transmits measured data determined to be important based on a predetermined policy over other measured data.

3. The data collection and management system according to claim 1;
   wherein the terminal(s) further comprises a storage unit that stores attribute classification information used for classifying measured data into first measured data and second measured data that is dependent on the first measured data; and
   wherein the calculation unit calculates the information value of measured data classified into the first measured data.

4. The data collection and management system according to claim 1;
   wherein, based on measured data that has already been acquired prior to first timing at which measured data, for which the information value is calculated, is acquired, the calculation unit calculates a first probability distribution of measured data at a timing at or after the first timing;
   wherein, based on measured data that has already been acquired up until the first timing inclusive, the measured data including the measured data acquired at the first timing, the calculation unit calculates a second probability distribution of measured data at a timing at or after the first timing; and
   wherein the calculation unit calculates the information value of measured data based on a distance between the first probability distribution and the second probability distribution.

5. The data collection and management system according to claim 1;
   wherein the management apparatus further comprises a transmission cost management unit that increases a value representing the transmission cost information as concentration degree of resources amount consumed by measured data transmitted by the terminal(s) increases.

6. The data collection and management system according to claim 1;
   wherein the management apparatus further comprises an estimation unit that receives measured data preferentially transmitted from the terminal(s) over other measured data and estimates measured data that has not been received yet from the terminal(s) based on the preferentially-transmitted measured data.

7. A data collection and management method, comprising:
   causing a terminal(s) to transmit measured data to a management apparatus;
   causing a management apparatus to notify the terminal(s) of transmission cost information indicating a cost incurrable upon transmitting measured data to the management apparatus by the terminal(s);
   calculating an information value indicating a value of measured data as information; and
   causing the terminal(s) to determine whether to transmit measured data to the management apparatus based on the information value and the transmission cost information, including calculating transmission probability of measured data by performing statistical processing on the information value and the transmission cost information and transmits the measured data to the management apparatus in accordance with the transmission probability.

8. A terminal, comprising:
   a calculation unit that calculates an information value indicating a value of measured data as information; and
   a transmission control unit that determines whether to transmit measured data to a management apparatus based on: transmission cost information indicating a cost incurrable upon transmitting the measured data by the terminal to the management apparatus that manages measured data; and the information value,
   wherein the transmission control unit calculates transmission probability of measured data by performing statistical processing on the information value and the transmission cost information and transmits the measured data to the management apparatus in accordance with the transmission probability.

9. A management apparatus, comprising:
   a reception unit that receives measured data transmitted from a terminal(s); and
   a notification unit that notifies the terminal(s) of transmission cost information indicating a cost incurrable upon transmitting measured data to the management apparatus by the terminal(s),
   wherein the terminal(s) calculate transmission probability of measured data by performing statistical processing on the information value and the transmission cost information and transmits the measured data to the management apparatus in accordance with the transmission probability.

* * * * *